United States Patent
Bensoussan et al.

(10) Patent No.: US 6,581,068 B1
(45) Date of Patent: Jun. 17, 2003

(54) SYSTEM AND METHOD FOR INSTANT CONSOLIDATION, ENRICHMENT, DELEGATION AND REPORTING IN A MULTIDIMENSIONAL DATABASE

(75) Inventors: Pierre Bensoussan, Meudon (FR); Antoine De Jaegere, Paris (FR)

(73) Assignee: Cartesis, S.A. (FR)

( * ) Notice: Subject to any disclaimer, the term of this patent is extended or adjusted under 35 U.S.C. 154(b) by 0 days.

(21) Appl. No.: 09/497,007

(22) Filed: Feb. 2, 2000

(30) Foreign Application Priority Data

Dec. 1, 1999 (FR) .............................. 99 15305

(51) Int. Cl.⁷ .............................................. G06F 17/30
(52) U.S. Cl. ..................... 707/104.1; 707/102; 707/100
(58) Field of Search ............................... 707/2, 1, 3, 4, 707/100, 104.1, 102

(56) References Cited

U.S. PATENT DOCUMENTS

| | | | |
|---|---|---|---|
| 5,940,818 A | | 8/1999 | Malloy et al. ................. 707/2 |
| 5,978,788 A | | 11/1999 | Castelli et al. ................. 707/2 |
| 6,154,766 A | * | 11/2000 | Yost et al. ................... 709/201 |
| 6,167,396 A | * | 12/2000 | Lokken ......................... 707/3 |
| 6,205,447 B1 | * | 3/2001 | Malloy ....................... 707/102 |
| 6,226,647 B1 | * | 5/2001 | Venkatasubramanian et al. ........................... 707/102 |
| 6,272,487 B1 | * | 8/2001 | Beavin et al. ................. 707/2 |
| 6,289,352 B1 | * | 9/2001 | Proctor ....................... 707/102 |
| 6,317,750 B1 | * | 11/2001 | Tortolani et al. ............ 707/103 |
| 6,385,604 B1 | * | 5/2002 | Bakalash et al. ............... 707/3 |
| 6,405,207 B1 | * | 6/2002 | Petculescu et al. ......... 707/102 |
| 6,418,427 B1 | * | 7/2002 | Egilsson et al. ............... 707/2 |

FOREIGN PATENT DOCUMENTS

EP 0770967 5/1997

OTHER PUBLICATIONS

XP 000978044, vol. 7, No. 1, 9/99 pp. 41–59 Mohania et al., Advances and Research Directions in Data–Wanehousing Tech.

* cited by examiner

Primary Examiner—Greta Robinson
(74) Attorney, Agent, or Firm—Muserlian, Lucas and Mercanti

(57) ABSTRACT

A method, system and article of manufacture are provided which enhance the ability to aggregate, analyze and report data from a multidimensional database in a memory. The database consists of a hierarchy of data items, each item representing an account. Each account may hold either numerical data (figures) or multimedia content. The invention is particularly useful in assisting financial controllers of a multinational company or other organization in gathering data and generating reports. The invention complies with existing on-line analytical processing (OLAP) standards, and improves upon conventional OLAP methods, software and systems. The present invention includes some innovative new features, such as: incubescent data structure, joint dimensions, delegation using "datareqs," cycle preservation, enrichment and instant consolidation. Navigation and communication tools are also included.

1 Claim, 25 Drawing Sheets

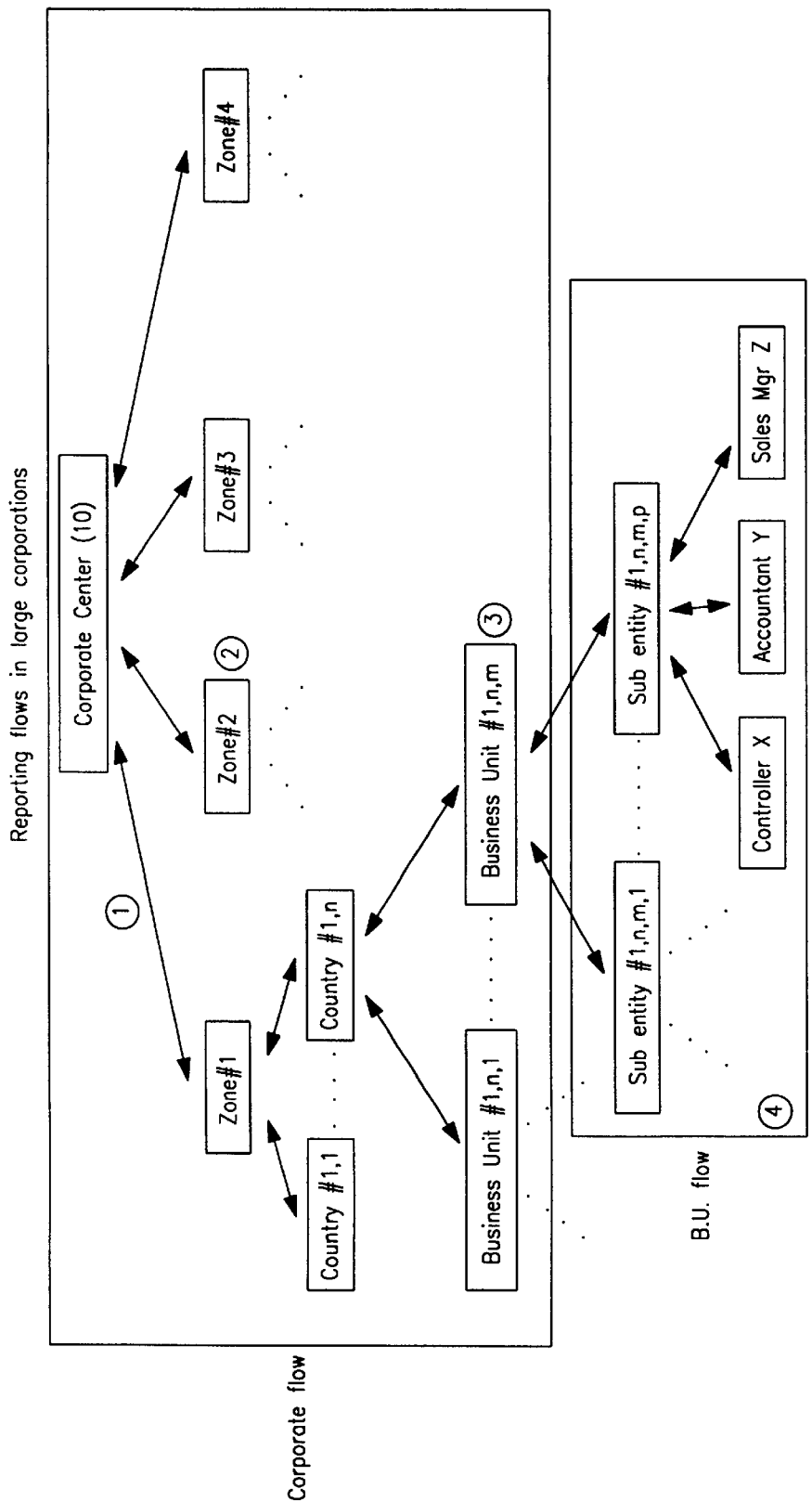

FIG. 1
PRIOR ART

Notes:
1. This diagram uses only one dimension to describe the reporting flow. In matrix organizations, it should be represented multi-dimensionnaly.
2. Each box in the diagram is handled technically as one physical site.
3. Only data entry is allowed at the B.U. levels and beyond. Local customization of the Corporate reporting framework is not possible.
4. Corporate and B.U. flows are commonly disconnected in terms of processes and tools.

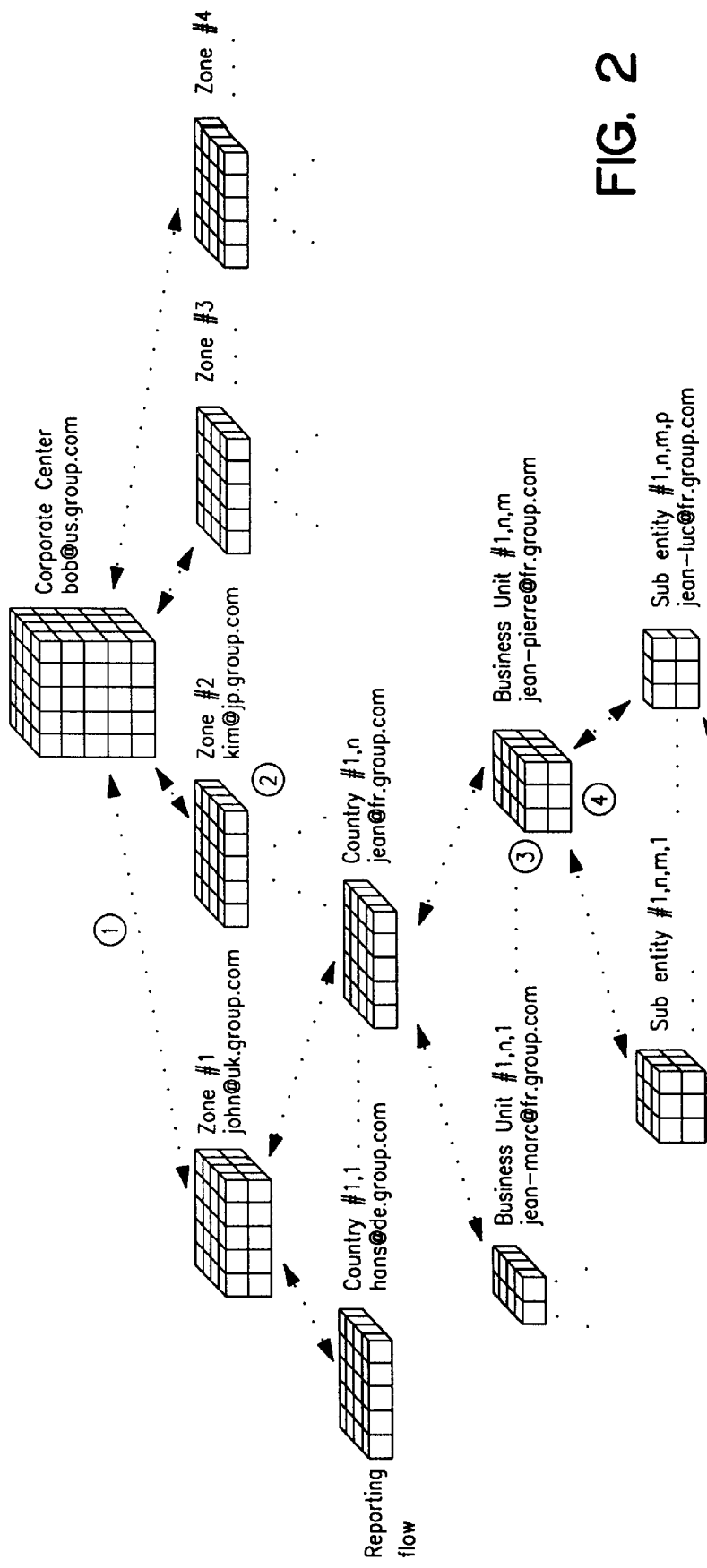

FIG. 2

Notes:
1. This diagram uses only one dimension to describe the reporting flow. In matrix organizations, it should be represented multi-dimensionnaly.
2. Reporting responsibility is delegated to individuals through 'datareqs'.
3. Every level has the same set of functionlities, including 'instant consolidation'.
4. Corporate and B.U. flows are integrated. Each level can enhance the corporate framework ('enrichment').

Joint Dimensions

Dimension dim1: | a | b | c |

Dimension dim2: | 1 | 2 |

Joint Dimension dim1⊗dim2: | a1 | b1 | c1 | a2 | b2 | c2 |

FIG. 6

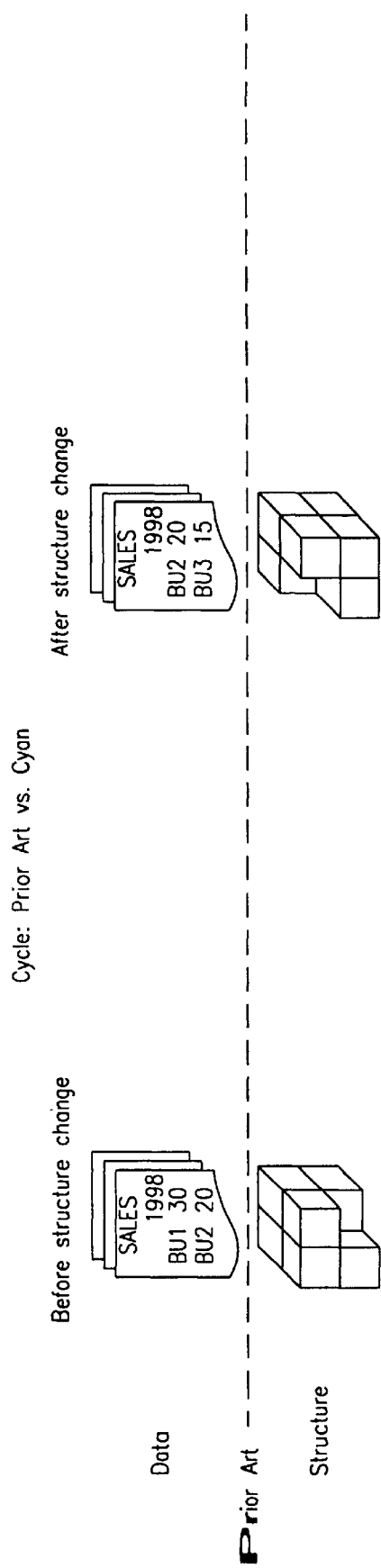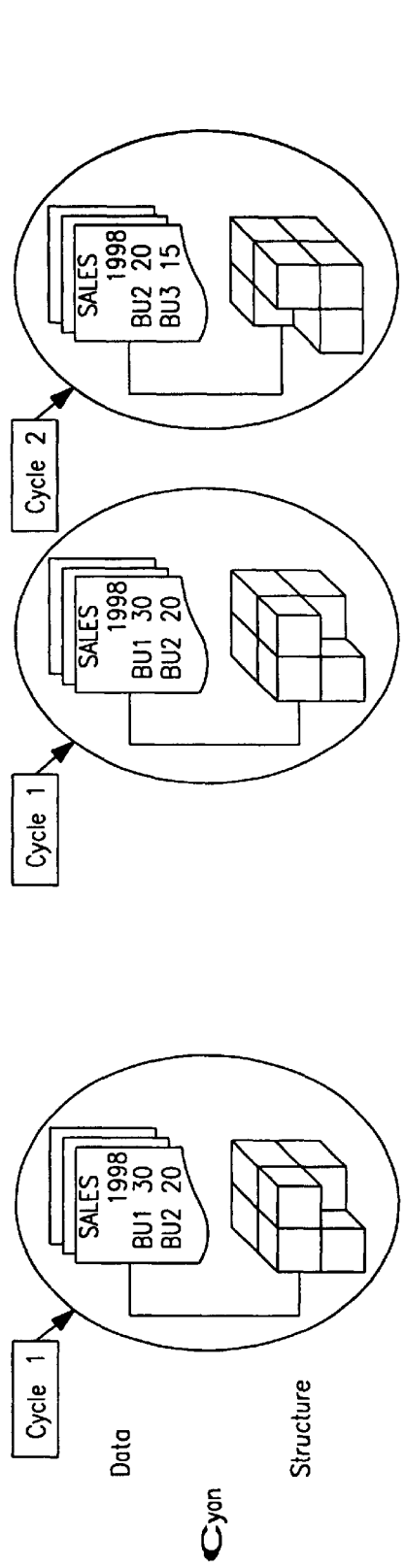
FIG. 9

Cycle: Multi-Structure Comparisons
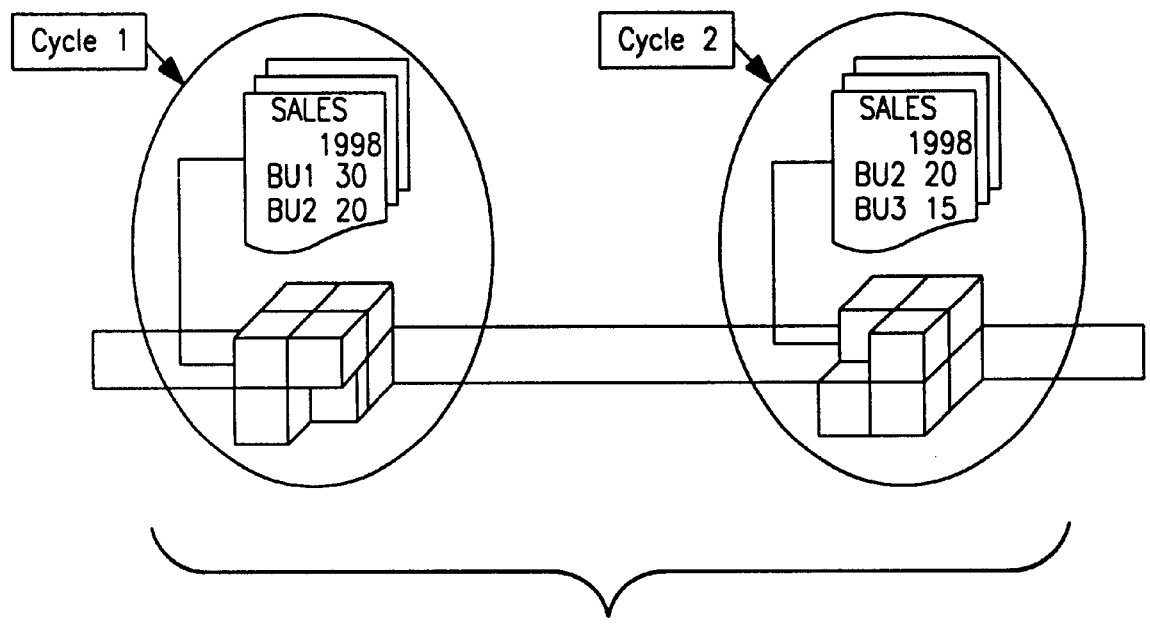
COMPARSION
```
SALES  1998
         Cycle 1    Cycle 2
BU1      30          --
BU2      20          20
BU3      --          15
```
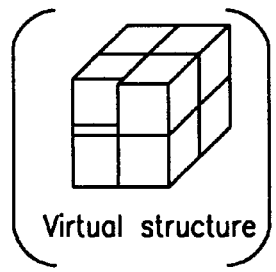
Virtual structure
FIG. 10

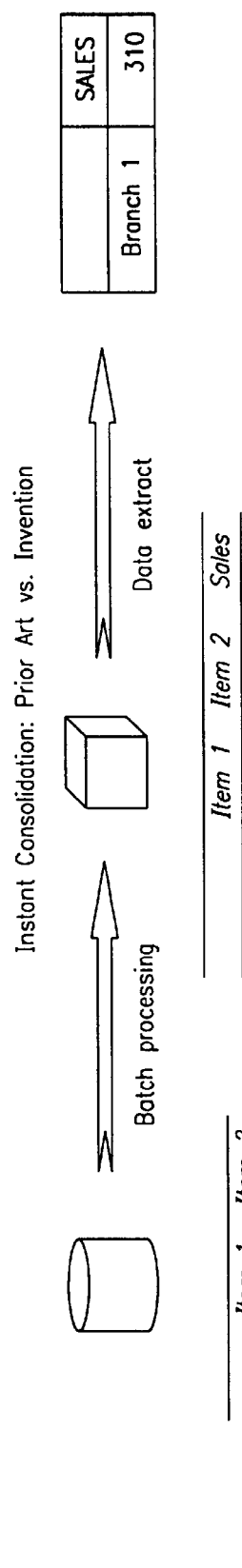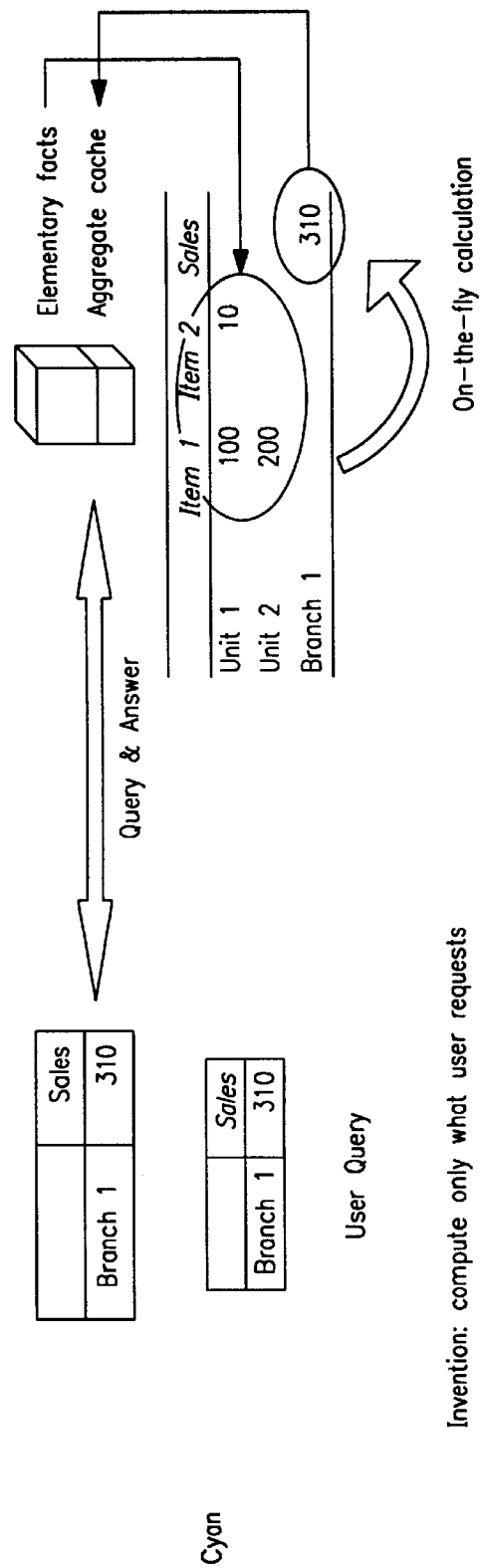
FIG. 12

*The flow chart for the Get Amount step is described on the next diagram.

FIG. 22

Nature=Collected,Collected  Stage=Final stage  Target Currency=U.S. Dollar  Time level=Period  Processing=Reported  Rate Version=Official rate File  Edit  View  Message  Viewers  Tools  ?

Entity CYAN Corpo ▽  Category ACTUAL ▽

CUBE AND CORE–CUBE

| Indicator | Category ▽ |  |  |
|---|---|---|---|
|  | ACTUAL | BUDGET | VAL (%) |
| Net sales and revenues | 515 375.7 | 753 300.3 | -31.6 |
| Manufactured Products Sales | 428 353.2 | 578 345.6 | -25.9 |
| financial products | 44 247.1 | 95 906.8 | -53.9 |
| Other Income | 42 775.5 | 79 047.8 | -45.9 |
| Cost and expenses | 367 240.7 | 579 859.2 | -36.7 |
| Cost of sales | 183 834.5 | 256 015.3 | -28.2 |
| Administrative expenses | 14 967.5 | 27 630.5 | -45.8 |
| Interest expenses | 67 649.7 | 118 734.7 | -43.0 |
| Depreciation of real estate,plants,eq. | 63 982.6 | 110 595.2 | -42.1 |
| Amortization | 36 806.4 | 66 883.5 | -45.0 |
| Income before taxes | 148 135.0 | 173 441.1 | -14.6 |
| Income before taxes % M.P sales | 34.6 | 30.0 | 15.3 |
| Income tax | 48 884.5 | 57 235.6 | -14.6 |
| Other Income (loss) | 99 250.4 | 116 205.5 | -14.6 |
| Payroll | 11 440.2 | 28 508.9 | -59.9 |
| Fixed term payroll | 331.2 | 815.4 | -59.4 |
| Permanent payroll | 11 108.9 | 27 693.5 | -59.9 |

Collected | Final stage | U.S.Dollar | Period | Reported | Official rate

FIG. 23

INSTANT CONSOLIDATION: CURRENCY CONVERSION

Nature=Collected,Collected  Stage=Final stage  Target Currency=Euro  Time level=Period  Processing=Reported  Rate Version=Official rate File  Edit  View  Message  Viewers  Tools  ?

Period | Year 1998    Entity | CYAN Corp.

| Indicator | Category | | |
|---|---|---|---|
| | ACTUAL | BUDGET | VAL (%) |
| ☐ Net sales and revenues | 484 602.7 | 708 321.0 | -31.6 |
| ☐ Manufactured Products Sales | 402 776.3 | 543 812.8 | -25.9 |
| ☐ financial products | 41 605.1 | 90 180.3 | -53.9 |
| ☐ Other Income | 40 221.3 | 74 327.9 | -45.9 |
| ☐ Cost and expenses | 345 312.9 | 545 236.0 | -36.7 |
| ☐ Cost of sales | 172 857.8 | 240 728.7 | -28.2 |
| ☐ Administrative expenses | 14 073.8 | 25 980.7 | -45.8 |
| ☐ Interest expenses | 63 610.4 | 111 645.1 | -43.0 |
| ☐ Depreciation of real estate,plants,eq. | 60 162.2 | 103 991.6 | -42.1 |
| ☐ Amortization | 34 608.7 | 62 889.9 | -45.0 |
| ☐ Income before taxes | 139 289.9 | 163 085.0 | -14.6 |
| ☐ Income before taxes % M.P sales | 34.6 | 30.0 | 15.3 |
| ☐ Income tax | 45 965.7 | 53 818.0 | -14.6 |
| ☐ Other Income (loss) | 93 324.2 | 109 266.9 | -14.6 |
| ☐ Payroll | 11 440.2 | 28 508.9 | -59.9 |
| ☐ Fixed term payroll | 331.2 | 815.4 | -59.4 |
| ☐ Permanent payroll | 11 108.9 | 27 693.5 | -59.9 |

Target Currency

Focus On:
☐ Entity Currency
☐ Reporting Currency
☐ Capture Currency
☐ Chinese Yuan
☑ Euro
☐ French Francs
☐ German mark
☐ Japanese Yen
☐ Sterling pound
☐ U.S. Dollar Focus On Mode: Don't skip any level Auto Expand:

Close

Collected | Final stage | Euro | Period | Reported | Official rate

FIG. 24

INSTANT CONSOLIDATION: INTERCOMPANY ELIMINATION

Nature=Collected.Collected  Stage=Final stage  Target Currency=Euro  Time level=Period  Processing=Reported  Rate Version=Official rate File  Edit  View  Message  Viewers  Tools  ?

Period | Year 1998 | ▷        Indicator | Manufac.... | ▷

| Entity | Category ▷ | | |
|---|---|---|---|
| | ACTUAL | BUDGET | VAL (%) |
| ☐ CYAN Corporation | 304 134.0 | 446 534.7 | -31.9 |
| ☐ America | 94 081.7 | 146 964.0 | -36.0 |
| ☐ Canada | 11 178.2 | 21 490.0 | -48.0 |
| ☐ AXXON | 6 012.2 | 7 012.1 | -14.3 |
| ☐ Canadian Telecom | 2 835.0 | 8 163.0 | -65.3 |
| ☐ Radar IE Cle | 2 331.0 | 6 314.8 | -63.1 |
| ☐ USA | 86 777.5 | 128 838.4 | -32.6 |
| ☐ Elimination | -3 874.0 | -3 364.4 | 15.1 |
| ☐ Asia | 184 425.9 | 205 689.3 | -10.3 |
| ☐ Europe | 87 660.1 | 150 334.2 | -41.7 |
| ☐ England | 65 608.1 | 107 375.8 | -38.9 |
| ☐ GMS Navigators | 1 254.7 | 2 873.8 | -56.3 |
| ☐ Jimbo LTD | 59 619.9 | 97 195.4 | -38.7 |
| ☐ Royce LTD | 8 875.4 | 13 381.4 | -33.7 |
| ☐ Elimination | -4 141.8 | -6 074.7 | -31.8 |
| ☐ France | 17 570.1 | 28 976.9 | -39.4 |
| ☐ Germany | 9 215.5 | 21 288.1 | -56.7 |
| ☐ Elimination | -4 733.5 | -7 306.6 | -35.2 |
| ☐ Elimination | -62 033.7 | -56 452.8 | 9.9 |

Focus On:
☐ Reported
☐ Eliminated Contrib.
☐ Consolidated Contrib.
☐ Eliminated At level
☑ Consolidated At level Focus On Mode: Don't skip any level ▷

Auto Expand: ▷

Close

Collected | Final stage | Euro | Period | Consolidated At level | Official rate

FIG. 25

INSTANT CONSOLIDATION: TIME AGGREGATION

Nature=Collected,Collected  Stage=Final stage  Target Currency=U.S. Dollar  Time level=Period  Processing=Reported  Rate Version=Official rate File  Edit  View  Message  Viewers  Tools  ?

Category  ACTUAL  ▷    Entity  CYAN Corpo  ▷

| Indicator | January | February | March | April | May | June | July |
|---|---|---|---|---|---|---|---|
| ☐ Net sales and revenues | 54 319.2 | 90 724.7 | 128 125.5 | 44 458.6 | 77 406.8 | 112 718.6 | 79 183.9 |
| ☐ Manufactured Products Sales | 47 938.4 | 78 176.2 | 108 133.9 | 38 359.2 | 64 879.5 | 92 995.5 | 71 303.2 |
| ☐ financial products | 4 628.1 | 8 647.0 | 13 548.6 | 3 159.7 | 6 429.9 | 10 048.2 | 3 896.0 |
| ☐ Other Income | 1 752.7 | 3 901.6 | 6 443.0 | 2 937.8 | 6 097.4 | 9 675.0 | 3 984.7 |
| ☐ Cost and expenses | 35 295.9 | 68 193.2 | 101 187.0 | 29 124.6 | 54 272.7 | 81 285.5 | 36 295.8 |
| ☐ Cost of sales | 21 840.5 | 40 826.3 | 59 209.0 | 14 057.1 | 23 537.9 | 34 232.8 | 19 376.3 |
| ☐ Administrative expenses | 1 280.9 | 2 553.5 | 3 837.7 | 1 276.0 | 2 556.9 | 3 846.1 | 1 294.0 |
| ☐ Interest expenses | 5 784.3 | 11 554.8 | 17 346.3 | 5 777.7 | 11 562.0 | 17 360.1 | 5 805.2 |
| ☐ Depreciation of real estate,plants | 3 293.7 | 7 079.4 | 11 462.5 | 4 875.2 | 10 304.3 | 16 309.5 | 6 559.8 |

Cyan — Charts

ACTUAL CYAN Corporation 175000.0
150000.0
125000.0
100000.0
75000.0
50000.0
25000.0
0.0

☐ Net sales and revenues

| | | | 3 138.6 | 6 311.5 | 9 537.1 | 3 260.5 |
| | | | 15 331.9 | 23 134.1 | 31 433.0 | 42 888.1 |
| | | | 40.0 | 35.7 | 33.9 | 60.1 |
| | | | 5 059.5 | | | 153.1 |
| | | | 10 272.4 | | | 735.0 |
| | | | 12 514.0 | | | 534.0 |
| | | | 362.0 | | | 363.0 |
| | | | 12 152.0 | | | 171.0 |

Time Level

Focus On:  ☐ Period  ☑ Quarter  ☐ Semester  ☐ Year  ☐ Cycle

Focus On Mode: Don't skip any level ▷

Auto Expand: ▷

Close

Collected | Final stage | Euro | Quarter | Reported | Official rate

SYSTEM AND METHOD FOR INSTANT CONSOLIDATION, ENRICHMENT, DELEGATION AND REPORTING IN A MULTIDIMENSIONAL DATABASE

BACKGROUND OF THE INVENTION

1. Field of the Invention

The present invention relates to the handling of data in multidimensional computer databases. More particularly, the invention uses on-line analytical processing (OLAP) and other techniques to manage, aggregate and report data in a multidimensional database. The invention is especially useful for effectively handling numerous accounts in a large database maintained by a multinational corporation or other organization.

2. Background of Database Technology and OLAP

On-line analytical processing (OLAP) is an application architecture, type or style of business intelligence computing that can support analytical applications, such as to help end users identify important business trends. OLAP is not data-warehouse technology or a database management system (DBMS).

There has been some confusion and misunderstanding about OLAP. In fact, in 1995 a group called the OLAP Council was formed in order to serve as advocacy group and an industry guide in order to educate the market about OLAP technology and provide common definitions, among other things. The OLAP Council issued certain "tenets," including the following: (1) The need of end users to analyze corporate data for the purpose of making better decisions is of paramount importance; (2) OLAP technologies are essential to delivering this end-user value and are a critical component of a broader information technology architecture; (3) Corporate data needs to be transformed into multidimensional aggregations supporting enterprise-scale data volumes and hierarchies; (4) Fast, consistent response to end-user requests is critical to interactive, ad-hoc exploration, comparison and analysis of data, regardless of database size and complexity; and (5) End users must be able to manipulate and derive data for analysis purposes by applying analytical operations such as ratios, cumulative totals, trends and allocations across dimensions and across hierarchical levels.

OLAP provides a number of key benefits that enable business professionals to make more efficient managerial and strategic decisions. Business workers who require access to large amounts of data in order to make their business decisions are able to use OLAP systems to flexibly manipulate data quickly and effectively, thus enhancing their analytical ability. In particular, OLAP allows the user to support complex analysis requirements, analyze data from a number of different perspectives (business dimensions), and support complex analyses against large input (atomic-level) data sets.

For further discussions of multidimensional database systems, OLAP and related concepts and technologies, see the glossary of terms appended to this application, and see:
Gartner Group: //www.gartnergroup.com
Pilot Software: //www.pilotsw.com/olap/olap.htm
OLAP: The Panacea for the Ills of Management Information Systems?
//www/sgroves.demon.co.uk/justolap.html
OLAP reference sites: //www.pvv.ntnu.no/~akselh/olap.htm
OLAP Report: //www.olapreport.com
The OLAP Council: //www.olapcouncil.org
See also U.S. Pat. Nos. 5,943,668; 5,642,524; 5,669,008; 5,794,059; 5,706,495; 5,799,300; 5,819,258; 5,815,155; 572,644; 5,832,182; 5,280,547; and 5,822,751.

SUMMARY OF THE INVENTION

A method, system and article of manufacture are provided which enhance the ability to aggregate, analyze and report data stored in a multidimensional database. The database consists of a hierarchy of data items, each item representing an account. Each account may hold either numerical data (figures) or multimedia content. The invention is particularly useful in assisting financial controllers of multinational corporations or other organizations in gathering data, analyzing data and generating reports. The invention complies with existing on-line analytical processing (OLAP) standards, and improves upon conventional OLAP methods, software and systems. The invention includes a self-contained data model allowing shared language among finance officers across the organization or group. The invention further provides a full-featured database, and organizes data in the form of a multidimensional matrix of up to 32 dimensions. The present invention includes some-innovative new features, such as: incubescent data structure, joint dimensions, delegation using "datareqs," cycle preservation, enrichment and instant consolidation. Navigation and communication tools are also included.

BRIEF DESCRIPTION OF THE DRAWINGS

Referring now to the drawings, in which like reference numbers represent corresponding parts throughout:

FIG. 1 is a pictorial diagram and flowchart showing a typical prior art management structure and reporting flow in a large corporation.

FIG. 2 is a general flowchart showing the invention as applied to reporting flows in a large corporation.

FIG. 6 is a pictorial diagram showing typical joint dimensions in the structure of FIG. 4.

FIG. 9 is a pictorial diagram showing the "cycle" feature of the present invention, showing "before" and "after" views, and comparing a prior art method with the method of the present invention.

FIG. 10 is a pictorial diagram showing the "cycle" feature of the present invention, and in particular showing multi-structural comparisons.

FIG. 12 is a flowchart showing the instant consolidation algorithm of the present invention, and comparing it with the prior art.

FIGS. 16–25 are screenshots of typical computer display screens that a user sees when he or she operates the method of the present invention using a personal computer. In particular:

FIG. 16 is a screenshot of a typical "home page."

FIG. 17 is a screenshot of the task scheduler feature of the invention.

FIG. 18 is a screenshot showing a multidimensional analysis and chart.

FIG. 19 is a screenshot of a representative graphical analysis.

FIG. 20 is a screenshot of a delegation window.

FIG. 21 is a screenshot of a delegate edition window.

FIG. 22 is a screenshot showing the breakdown of a cube and core-cube.

FIG. 23 is a screenshot of an instant consolidation operation, specifically currency conversion.

FIG. 24 is a screenshot of an instant consolidation operation, specifically intercompany elimination.

FIG. 25 is a screenshot of an instant consolidation operation, specifically time aggregation.

DETAILED DESCRIPTION OF THE PREFERRED EMBODIMENTS

Figure 3:
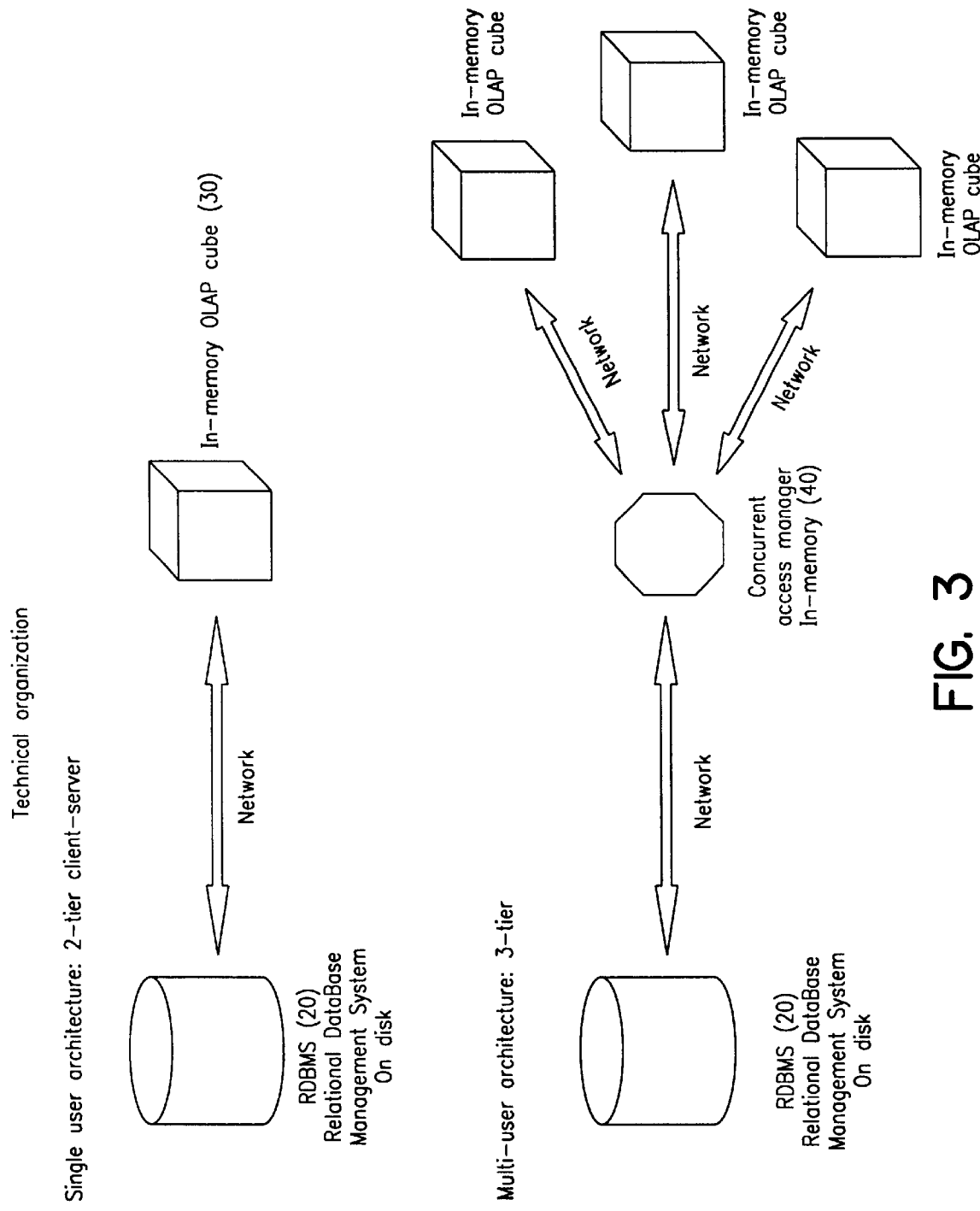
FIG. 3 is a block diagram of the technical organization in which the present invention operates.

The present invention, which is sometimes referred to herein by its project name, Cyan™, is a computer software package primarily designed to aid the finance controllers of a company, organization or group of entities to aggregate data and facilitate reporting.

The present invention facilitates the communication of financial information between the controllers of various group entities. It automates some recurring calculations required for the consolidation process, and offers tools to navigate around and report on collected data. Financial information is composed of figures identified through accounts. They are traditionally organized as "accounts." An "account" is the accepted industry term for a unit of accounting information. A significant part of financial information is not numeric, but rather consists of free-form multimedia data and comments. The present invention can handle this form of data as well.

Summary of Features

The Cyan product of the present invention includes some innovative new features, such as: incubescent data structure, joint dimensions, delegation using "datareqs," cycle preservation, enrichment and instant consolidation.

Incubescent data structure

Cyan provides an integrated data model (set of dimensions), which defines a framework of financial reporting, using an OLAP structure, and financial intelligence. It is an integrated process for use with an OLAP database. OLAP tools tend to represent the world as a large cube. The present invention employs a new data structure where data are always identified by an account. This account determines the set of dimensions that can be used to break data down. This data structure retains the benefits of the traditional chart of accounts, as organized in a hierarchy, but avoids the pitfalls of presenting a huge, unfamiliar datacube to users. Instead, the invention presents them first with a chart of accounts in the format they are used to.

Joint dimensions

The present invention further improves upon OLAP by introducing joint dimensions. This is a list of all pertinent combinations of some dimensions. For example, all products may not be sold in all countries. A joint dimension will enforce such a restriction, guiding users through data entry. Another interesting usage of joint dimensions is that a large number of dimensions can be joined to present only few joint dimensions to users. A user can then either browse data through the joint dimensions, which are simple to understand, or break a joint dimension into its constituents, enabling a richer, but more complex, navigation.

Delegation Using "Datareqs"; Communication of Delegation

Communication between those performing management reporting is often organized around requests for data, or "datareqs." A datareq is used, for example, by a manager to delegate responsibilities to others within a large corporation or other, organization.

At the highest level, the person responsible for reporting has to fill in a huge amount of data describing the entire group. This task can be handled by the responsible person, or delegated to others. To accomplish that, the present invention dispatches datareqs to others. Each datareq contains a description of the task and its constraints. A datareq also contains the description of all the resources needed to fulfill it. For example, the chart of accounts, the exchange rates, the group structure, the chart of accounts' documentation, current generally accepted accounting practices that should be applied when entering figures, etc. Datareqs promote a decentralized, ad hoc, organization of the delegation of work when they can more closely adhere to the repartition of knowledge and responsibility in the group than any centralized scheme.

The delegation scheme used by the present invention can be seen as a specialized workflow, tuned to optimize the fast production of accurate financial data. The present invention can define a way to delegate work in an organization or team of people. In addition, the invention improves upon the communication of delegation. Email communication permits offline working. Moreover, the invention replicates logical structure, not just a file of data. The invention generalizes email messages and sends them to the user with file attachments consisting of logical structures of reporting that is delegated.

Cycle Preservation (Preservation of Historical Data Structures)

The Cyan invention promotes a close integration of data and structure through the concept of "cycle." A cycle gathers together a structure (chart of accounts, group structure, exchange rates, etc.) and a set of data coherent with this structure. When the structure changes, all the data in the cycle are updated. If that is not what was intended, the user can create a new cycle and start afresh. Cycles also allow the preservation of historical data with historical structure, but this is not available in any known prior art system or method. Prior art systems normally keep only one active version of the structure, and force the user to see old data within the current structure. By contrast, the present invention includes built-in features to compare cycles, store old versions of structures and analyze the impact of the structure changes on the data.

Enrichment

As mentioned earlier, those who are performing a reporting task can delegate part or all of their work to another. One additional feature of the Cyan invention is called "enrichment." Enrichment means that one can ask others for more information than what one was asked to enter. For example, if asked about sales in a particular region, one could ask each delegate or sales representative in each area to enter sales broken down by product. The breakdown by product is an enrichment of the initial structure. A huge benefit of the present invention is that one can only add to what one was asked, but can't modify or delete parts of the datareq received. This guarantees that all actors in the reporting chain speak a common language.

Instant Consolidation

Consolidation is the process of aggregating gained information of various group entities in order to make a picture of the group as a whole. In the context of a multinational company having sales all over the world, this process involves aggregating data across the group structure and converting foreign currencies, while avoiding the "double counting" of intragroup operations. A consolidated reporting should represent group operations with the rest of the world, and thus must eliminate any exchange occurring between group entities.

Cyan supports consolidation through these built-in operations: (1) Aggregation of all elements into a hierarchy node; (2) Currency conversion, supporting accounting standards subtleties; (3) Intragroup elimination; and (4) Allocation, allowing for example, the dispatching of group costs to be allocated to each subsidiary.

Consolidation computation may be run interactively (i.e., in less than two seconds), allowing the same mode of usage as a spreadsheet. Contrary to many prior art systems, Cyan does not force users to be connected online to a central system. It can be used asynchronously, like email.

Thus, Cyan retains the ease-of-use of current practice (email and spreadsheets), but is far more structured and thus maintained. It can be run "on-the-fly." As mentioned above, examples of specific benefits of this feature include automatic currency translation in real-time and elimination of intercompany sales in real-time. The above operations are performed "live" and not using a batch process. Time aggregation and hierarchical aggregation can be performed on each dimension. The results are continuously displayed on the screen for the user.

Other Features.

Communication tools similar to email are integrated into Cyan providing a more rigid coupling environment than the juxtaposition of the spreadsheet and email. Cyan also supports all communications through a mechanism of subscription, where any person may register interest in some information published by someone else.

Navigation using the present invention is also fully supported. In fact, Cyan support of hierarchies on every dimension, even of multiple hierarchies on one dimension, provides a rich tool. Reports can be edited through the navigation tool. More complex ones are delegated to spreadsheets.

Cyan lies on top of transactional systems. It is not intended to replace them. It provides detailed information on day-to-day business, and provides aggregate information summarizing operations over a time period such as a day, week, month, or year.

Cyan provides a reporting language throughout the group, independent of the underlying transactional systems. It can be used to provide reports and to navigate around collected data.

A purpose of the present invention is to build a reporting framework to be used by a group based upon financial intelligence that is put into the cube database.

The present invention may be used not only in the area of finance but also in other areas. For example, it may support the collection of any kind of figures by a group of people. The invention also provides flexibility, and it is easy to roll out across an organization.

Discussion of Drawings

Turning now the drawings, FIG. 1 is a pictorial diagram and flowchart showing a typical prior art management structure and reporting flow in a large corporation. Today, large corporations and other organizations such as accounting firms are multinational in scope. Typically, they include a corporate center 10, which is usually housed in a corporate headquarters building. The corporation may also be divided into several regional divisions or zones. For example, as shown in FIG. 1, there are shown four zones, namely zone #1, zone #2, zone #3, and zone #4. These zones may, for example, represent different geographical areas, or may represent different product lines or corporatefiunctions (such as research, manufacturing, etc.) The organization may further be divided into separate physical offices in different countries, such as country #1.1 through country #1.n. Furthermore, each country office may serve several business units such as business unit #1.n.1 through business unit #1.n.m. Finally, each business unit may manage one or more local offices or sub-entities, such as sub-entity #1.n.m.1 through sub-entity #1.n.m.p. Within each sub-entity or business unit there are individuals who have various line responsibilities such as a controller, an accountant and a sales manager.

The various offices, individuals and levels of the corporation together form a hierarchy. The hierarchy is one of management, information flow, physical goods flows and other flows. In FIG. 1, an organization of reporting flows is shown. This shows a typical top-down reporting structure. Starting at the lowest level, controller X reports to a boss or manager located in a business unit or sub-entity #1.n.m.p. Similarly, an accountant Y may report to the same or different manager in sub-entity 1.n.m.p, and a sales manager Z may report to the same or different person in sub-entity #1.n.m.p. The manager of sub-entity #1.n.m.p reports, in turn, to the manager of business unit 1.n.m (reference number 3 in FIG. 1.) This manager, in turn, reports up to the manager of country #1.n, who reports to the manager of the zone #1 facility, who finally reports to a manager in corporate center 10.

Six management levels are shown in the hierarchy of FIG. 1 but, of course, a wide variety of different levels and structures are found in actual corporations. It should be noted that the diagram of FIG. 1 uses only one dimension to describe the reporting flows. In matrix organizations, the reporting structure is better shown multidimensionally. In addition, corporate and business unit reporting flows are commonly disconnected in terms of processes and tools.

FIG. 2 is a general flowchart showing the invention as applied to reporting flows in a large corporation. In FIG. 2, a large corporation having six management levels is shown. Corporate center 10 or corporate headquarters is shown as a large cube. The cube is a useful symbol because it represents a structured organization of many smaller units or sub-cubes. For purposes of simplicity, it is assumed that there is only one manager at the corporate center. He is identified with an email address, bob@us.group.com. The corporate center cube is shown having five layers. Each layer is a grid of 20 blocks, a 5×4 matrix. Therefore, the corporate center cube has dimensions of 5×4×5, or five units horizontally, five units vertically, and four units in the third dimension (into the paper).

The corporate structure of FIG. 2 is further divided into zones, country areas, business units, sub-entities, and individuals. Zone #1 includes two "layers" of the corporation and is managed by an individual designated by an email address john@uk.group.com. Zones #2, #3 and #4 each encompass different sections of one layer of the corporation. The reporting structure continues down through the business units, sub-entities and individuals.

It should be noted that the diagram of FIG. 2 uses only one dimension to describe the reporting flows. In matrix organizations, the reporting structure is better shown multidimensionally. In the present invention, reporting responsibility is delegated to individuals through "datareqs." In addition, every level in FIG. 2 has the same set of functionalities, including "instant consolidation." Also, corporate and business unit flows are integrated. Each level can enhance the corporate framework in a process known as "enrichment."

FIG. 3 is a block diagram of the technical organization in which the present invention operates. The invention is configured to operate in either of two computer system environments: (1) a single-user architecture or (2) a multi-user architecture. The single-user architecture is a two-tier client-server architecture. It includes a relational database management system (RDBMS 20) residing on a data storage unit, coupled to an in-memory OLAP cube database 30 through a network. The multiuser architecture is a three-tier architecture. It includes and RDBMS 20 on a storage device coupled to an in-memory concurrent access manager 40 through a network. The access manager 40, in turn, is coupled to a plurality of in-memory OLAP cube databases through networks.

Figure 4:
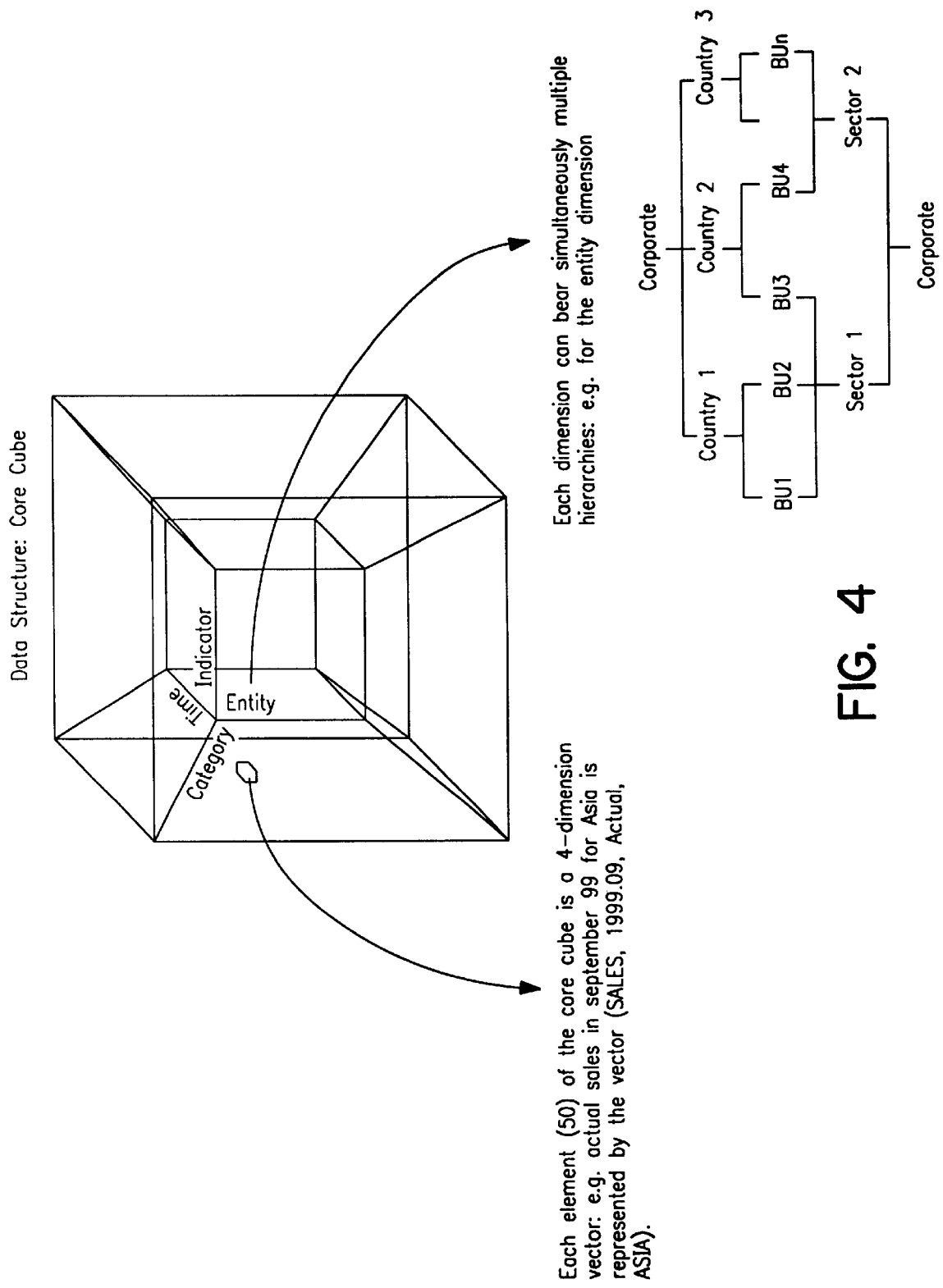
FIG. 4 is a pictorial diagram of the data structure of a core cube used in the present invention.

FIG. 4 is a pictorial diagram of the data structure of the core cube of the present invention. In a large organization the main database usually consists of a large quantity of data items that can be categorized in different ways. or along different dimensions. For example, sales data may be broken down by product category, business entity, time or date, geography, and actual vs. budgeted. In the example of FIG. 4, a 4-dimensional hypercube is used to illustrate a database with elements having data that can be categorized in four dimensions. The sample dimensions shown are category, entity, time, and indicator. Each element 50 of the core cube is a 4-dimensional vector. The vector may be represented by the expression: (sales, 1999.09, actual, Asia).

A great deal of other information is also normally hidden with the hypercube of FIG. 4. For example, each dimension can simultaneously bear (or embody or represent) multiple hierarchies. In the example shown, each dimension inherently embodies the following hierarchy:

Corporate
|
Countries 1, 2, 3
|
Business Units 1-n
|
Sectors 1, 2

A major challenge is how to deal with data of this complexity, and to consolidate, report and present it intelligently to managers and other decision-makers within the corporation. The present invention includes several features to facilitate the management and organization of this type of data, so as to improve consolidation, reporting and presentation.

Figure 5:
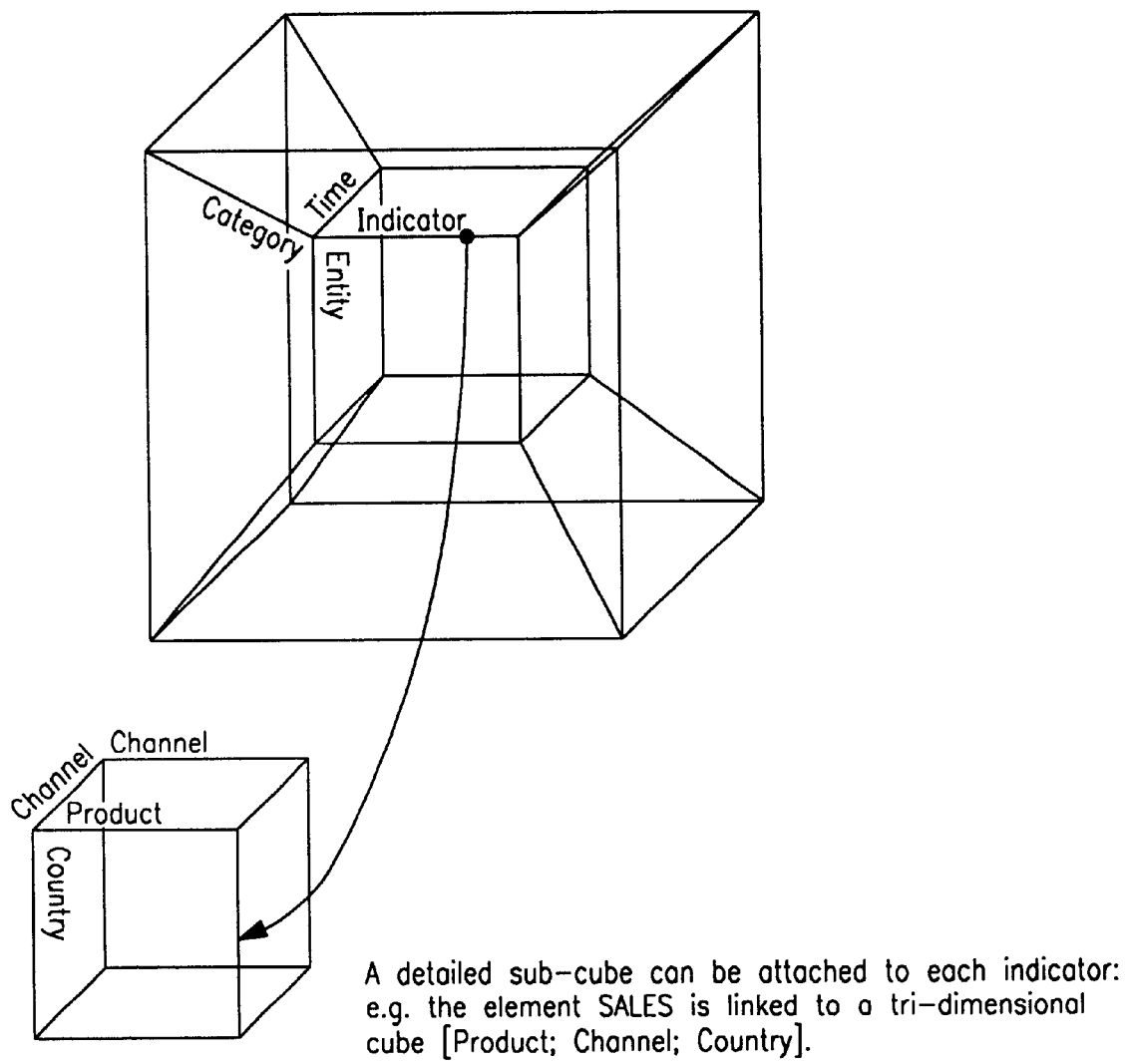
FIG. 5 is pictorial diagram showing a core cube and a typical sub-cube used in the structure of FIG. 4.

FIG. 5 is pictorial diagram showing a core cube and a typical sub-cube used in the structure of FIG. 4. One element of the hypercube of FIG. 5 may itself be expanded into a regular three-dimensional cube or sub-cube. In this example, the sub-cube for the chosen element has the sub-dimensions channel, product and country. A detailed sub-cube can be attached to each indicator. For example, the element "sales" is linked to a 3-dimensional cube, the vector coordinates of which are: (product; channel; country).

FIG. 6 is a pictorial diagram showing typical joint dimensions in the structure of FIG. 4. Dimension dim1 is shown having three elements, a, b, and c. Dimension dim2 contains the elements 1, 2. The joint dimension dim1 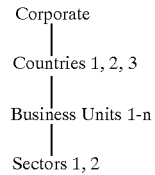 dim2 is calculated by an operation that results in a vector having the following elements: (a1, b1, c1, a2, b2, c2).

Figure 7:
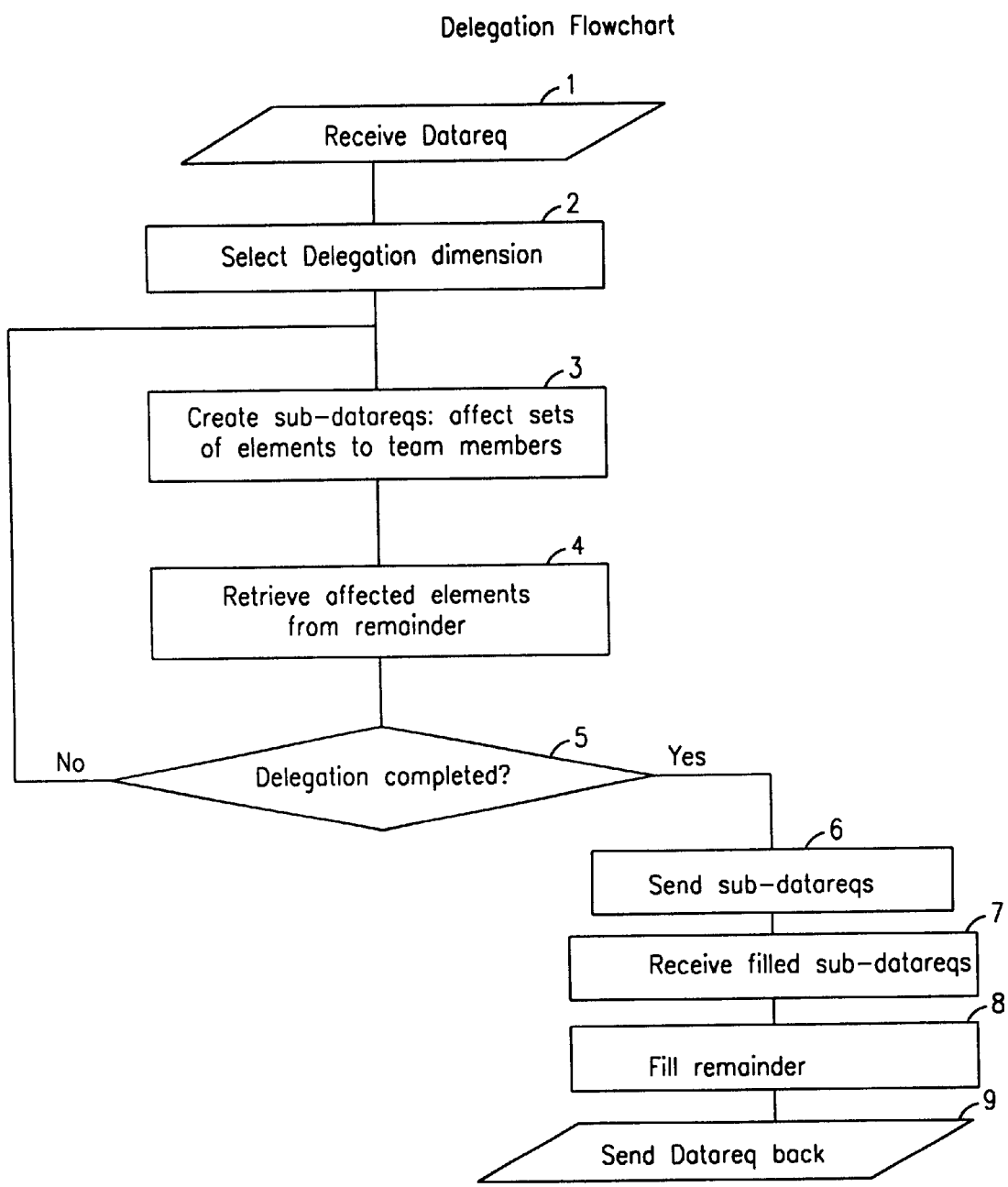
FIG. 7 is a flowchart of the delegation feature of the present invention.

FIG. 7 is a flowchart of the delegation feature of the present invention. The algorithm can be described as follows:

Step 1: Receive datareq, and proceed to 2.
Step 2: Select delegation dimension, and proceed to 3.
Step 3: Create sub-datareqs (sets of elements), and proceed to 4.
Step 4: Retrieve affected elements from remainder, and proceed to 5.
Step 5: Decision: Has delegation been completed? If no, return to 3; if yes, go to 6.
Step 6: Send sub-datareqs, and go to 7.
Step 7: Receive filled sub-datareqs, and go to 8.
Step 8: Fill remainder, and go to 9.
Step 9: Send datareq back, and stop.

Figure 8:
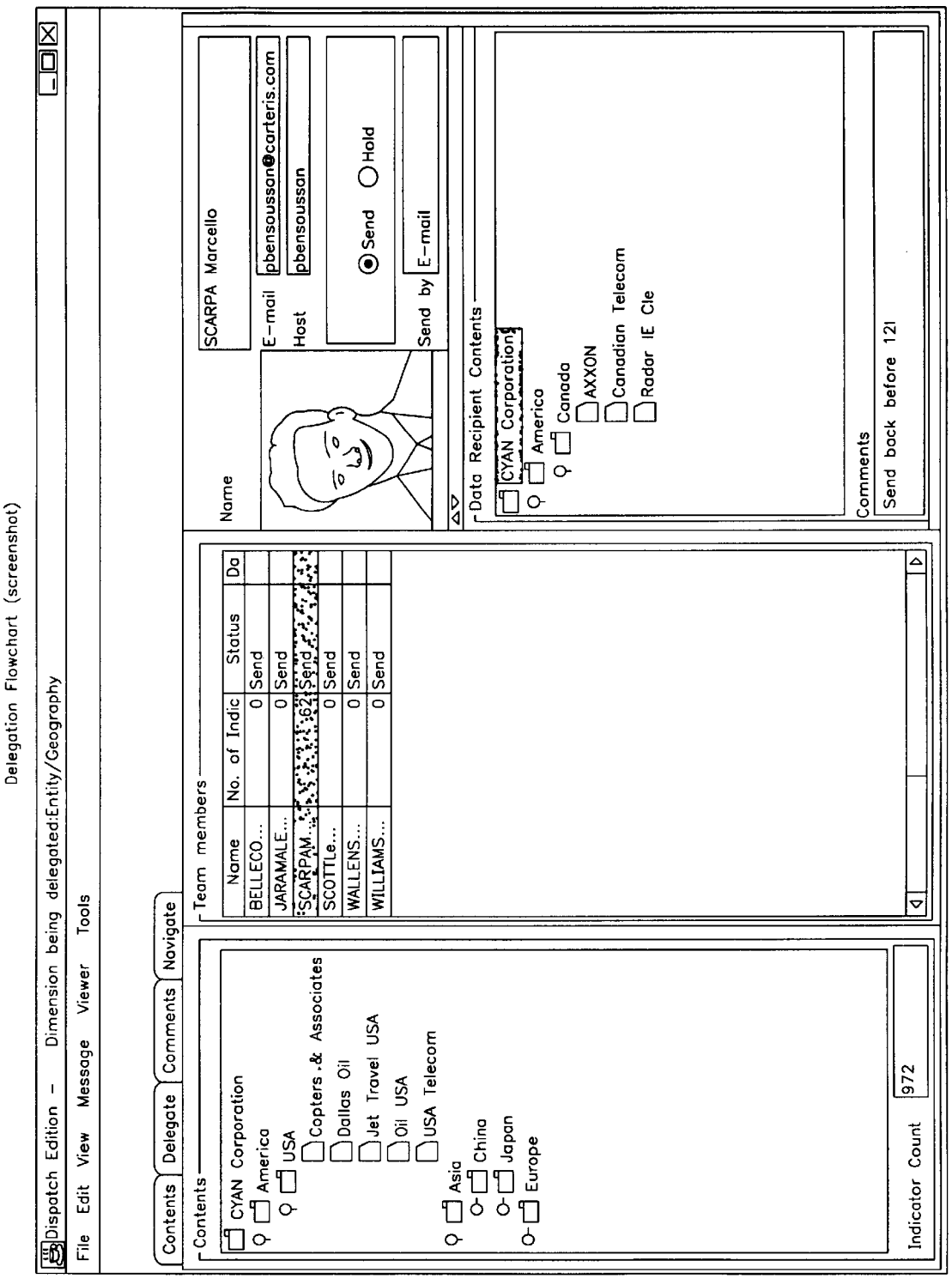
FIG. 8 is a screenshot showing the delegation feature of the present invention.

FIG. 8 is a screenshot showing the delegation feature of the present invention.

FIG. 9 is a pictorial diagram showing the "cycle" feature of the present invention, showing "before" and "after" views, and comparing a prior art method with the method of the present invention. To best understand this feature, it is important to understand that databases contain value not only in the individual data elements that make up the database, but also in the overall structure or organization of the database. Commonly, prior art corporate databases are changed or reorganized over time as corporate needs change. Such a change is called a "cycle." Although care is usually taken to preserve the integrity of each individual data item from one cycle to the next, little or no attention may be given to the preservation of overall historical data structures. Indeed, no information at all may be retained about the structure of an "old" database that has been migrated over or changed into a new computer system. Thus, previous versions are lost; data are not linked to the structure; and data comparison between two versions of the structure become difficult or impossible.

The present invention overcomes this disadvantage of the prior art by preserving every version of the database structure as it is changed. Data are linked to the structure; and data can be reliably compared between two different versions of the structure. The structure is preserved within the data itself as of the time of initial population of the database, and at each subsequent time at which the data changes.

FIG. 10 is a pictorial diagram showing the "cycle" feature of the present invention, and in particular showing multistructure comparisons. As the database passes from cycle 1 to cycle 2, a new "virtual structure" is created which permits the accurate comparison of data from the two cycles.

Figure 11:
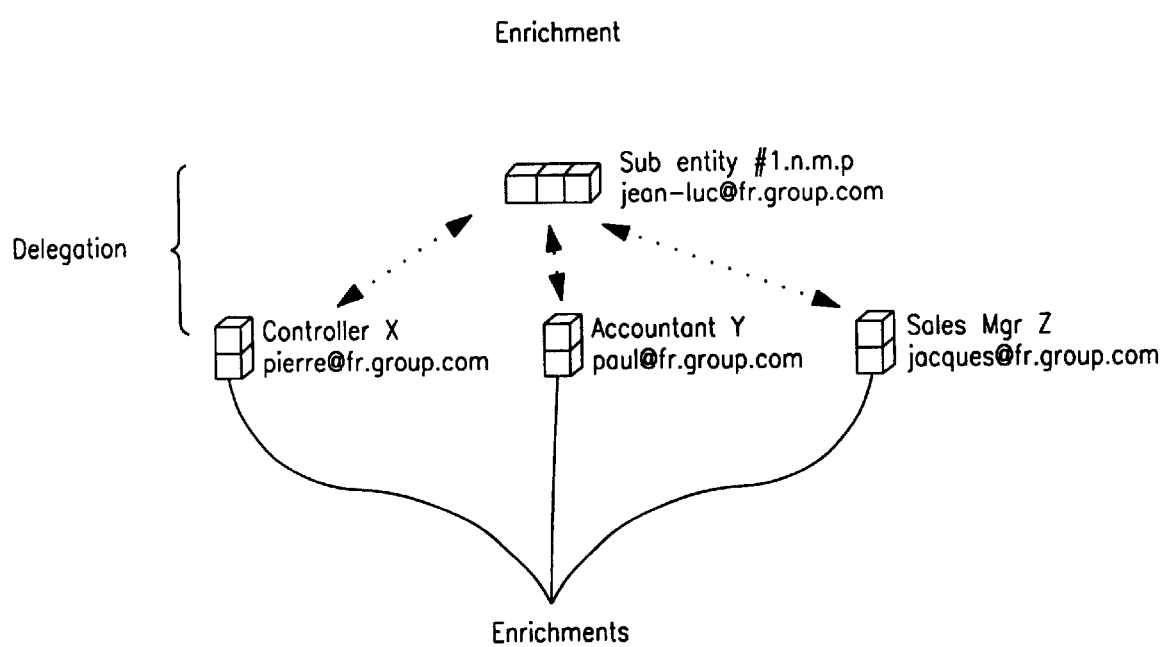
FIG. 11 is a pictorial diagram and flowchart showing the "enrichment" and "delegation" features of the present invention.

FIG. 11 is a pictorial diagram and flowchart showing the "enrichment" and "delegation" features of the present invention. Delegation in the traditional sense means giving someone else responsibility, or passing information down a management hierarchy. Individuals to whom tasks have been delegated may "enrich," i.e., add extra information and delegate the entry of this information to others. When they report back to their managers, the enriched information may be either discarded or kept as comments describing how required information was elaborated."

FIG. 12 is a flowchart showing the instant consolidation algorithm of the present invention, and comparing it with the prior art. A common operation in database management systems is the aggregation or consolidation of data. For example, sales figures for different business units may need to be combined to produce a total sales figure for a particular branch or region. The normal prior art method for such aggregation/consolidation is batch processing. In this method, the system pre-computes all or most of the aggregates that may be queried by users in the future. In FIG. 12, prior art systems aggregate facts into a new database of aggregates, which are then available to be extracted in response to a user query. This may lead to computing aggregates that will never by retrieved. By contrast, and a present Cyan system, aggregates are calculated "on-the-fly." A user may input a query, and the system will instantly consolidate the relevant facts and compute only the requested aggregates. These results are stored in a cache memory to speed up subsequent requests. The aggregates can then be immediately retrieved from the memory in response to an instantaneous query.

Figure 13:
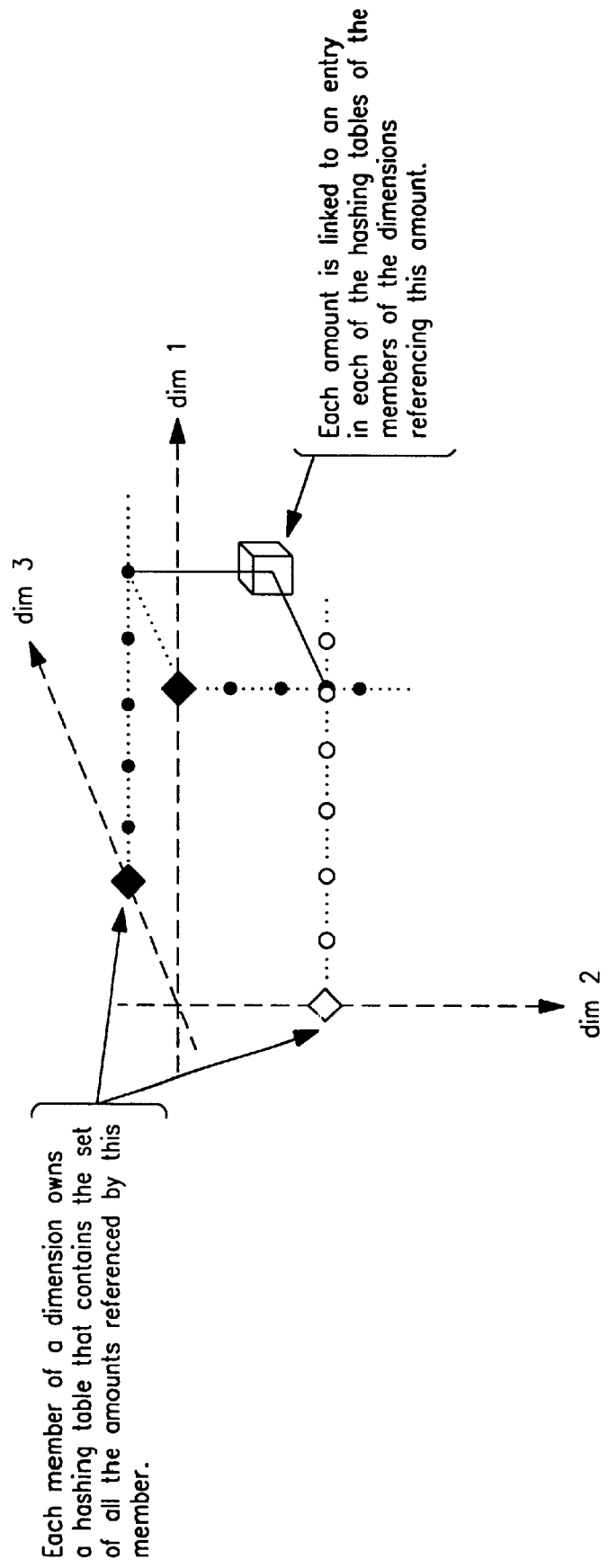
FIG. 13 is a pictorial structural diagram showing the "instant consolidation" feature of the present invention, and more particularly the "data indexing" feature.

FIG. 13 is a pictorial structural diagram showing the "instant consolidation" feature of the present invention, and more particularly the "data indexing" feature. A multidimensional database is shown having three primary dimensions, dim1, dim2 and dim3, representing three coordinate axes. Each member of the dimension has associated with it or "owns" a hashing table that contains the set of all the amounts referenced by this member. Each amount is linked to an entry in each of hashing tables of the members of the dimensions representing this amount.

Figure 14:
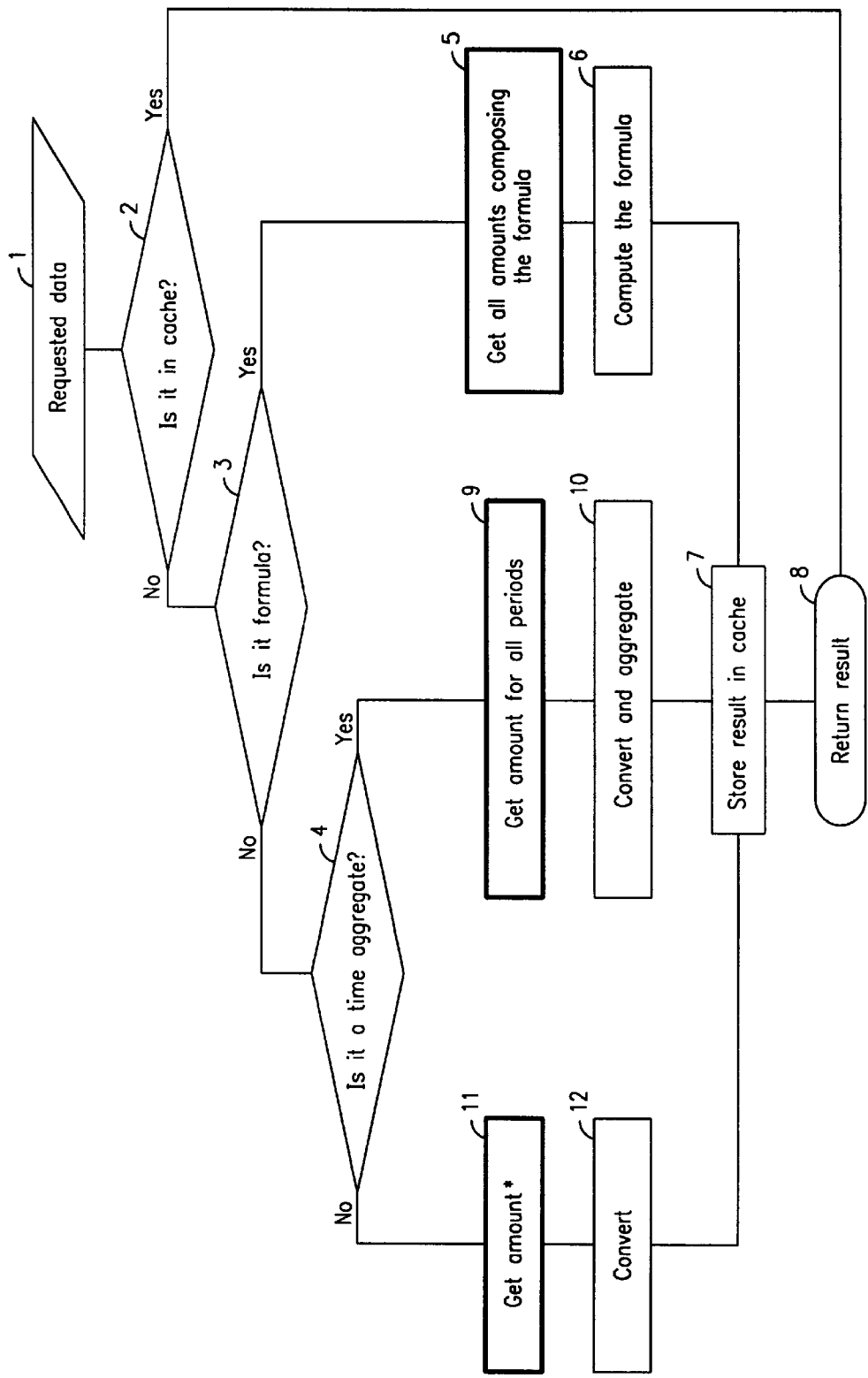
FIG. 14 is a flowchart of the primary steps of the "instant consolidation" method of the present invention.

FIG. 14 is a flowchart of the primary steps of the "instant consolidation" method of the present invention. The algorithm may be described in the following steps:

Step 1: Data is requested by user; then operation proceeds to Step 2.

Step 2: Decision: Is the data in cache? If yes, go to 8; if no, go to 3.

Step 3: Decision: Is the data a formula? If yes, go to 5; if no, go to 4.

Step 4: Decision: Is the data a time aggregate? If yes, go to 9; if no go to 11.

Step 5: Get all amounts comprising the formula, and proceed to 6.

Step 6: Compute the formula, and proceed to 7.

Step 7: Store the result in cache memory, and proceed to 8.

Step 8: Return the result to user, and stop.

Step 9: Get amount for all periods, and proceed to 10.

Step 10: Convert and aggregate, and proceed to 7.

Step 11: Get requested amount (see FIG. 15 for detail), and proceed to 12.

Step 12: Convert data, then proceed to 7.

Figure 15:
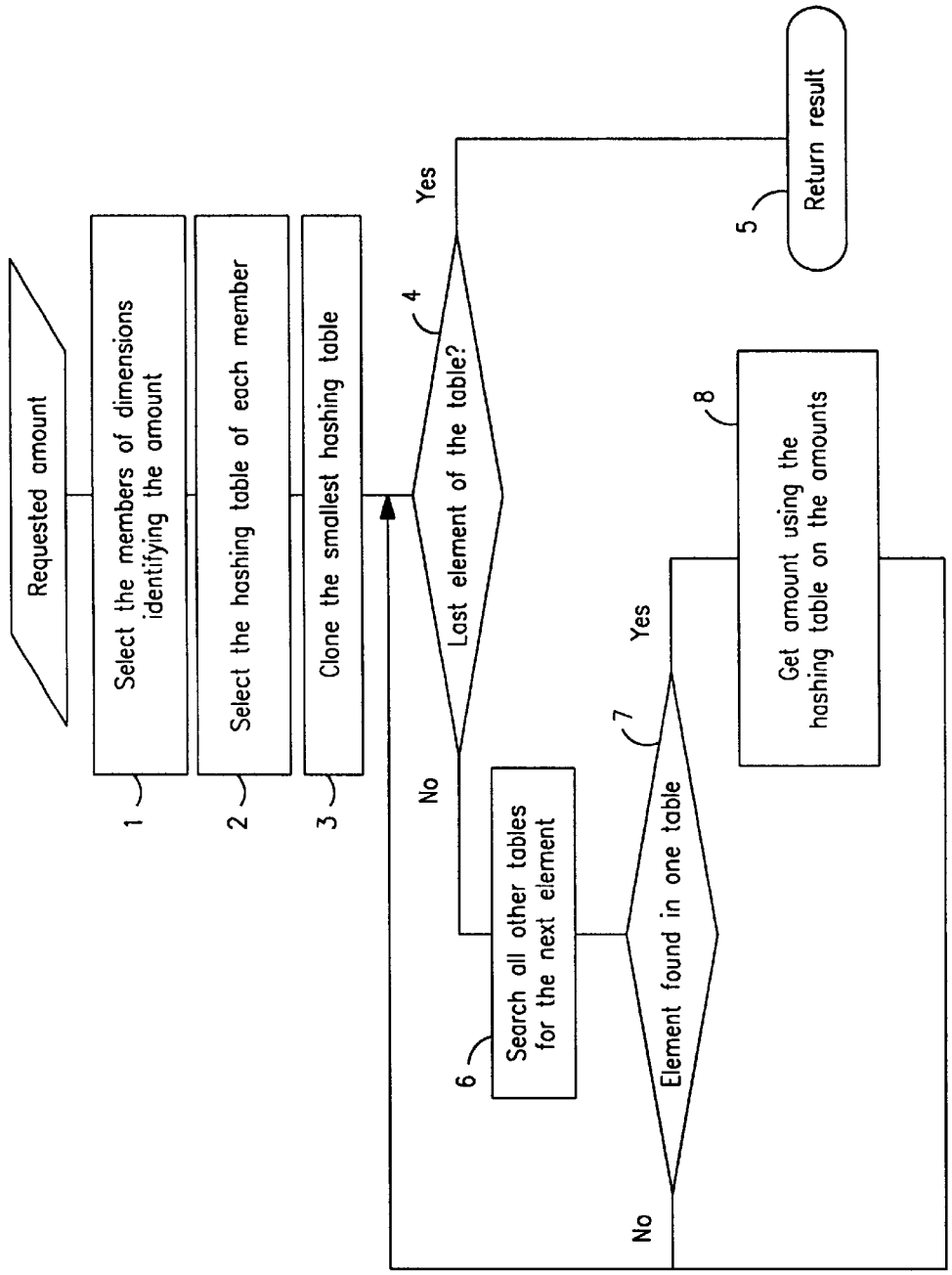
FIG. 15 is a flowchart of the "get amount" series of steps of the method of FIG. 14.

FIG. 15 is a flowchart of the "get requested amount" method of block 11 of FIG. 14. This method may be described in the following steps:

Step 1: Select the members of the dimensions identifying the amount, and proceed to 2.

Step 2: Select the hashing table of each member, and proceed to 3.

Step 3: Clone the smallest hashing table, and proceed to 4.

Step 4: Decision: Is this the last element of the table? If yes, go to 5; if no, go to 6.

Step 5: Return the result to user, and stop.

Step 6: Search all other tables for the next element, and proceed to 7.

Step 7: Decision: Is the element found in 1 table? If yes, go to 8; if no, return to 4.

Step 8: Get amount using the hashing table on the amounts, and return to 4.

Figure 16:
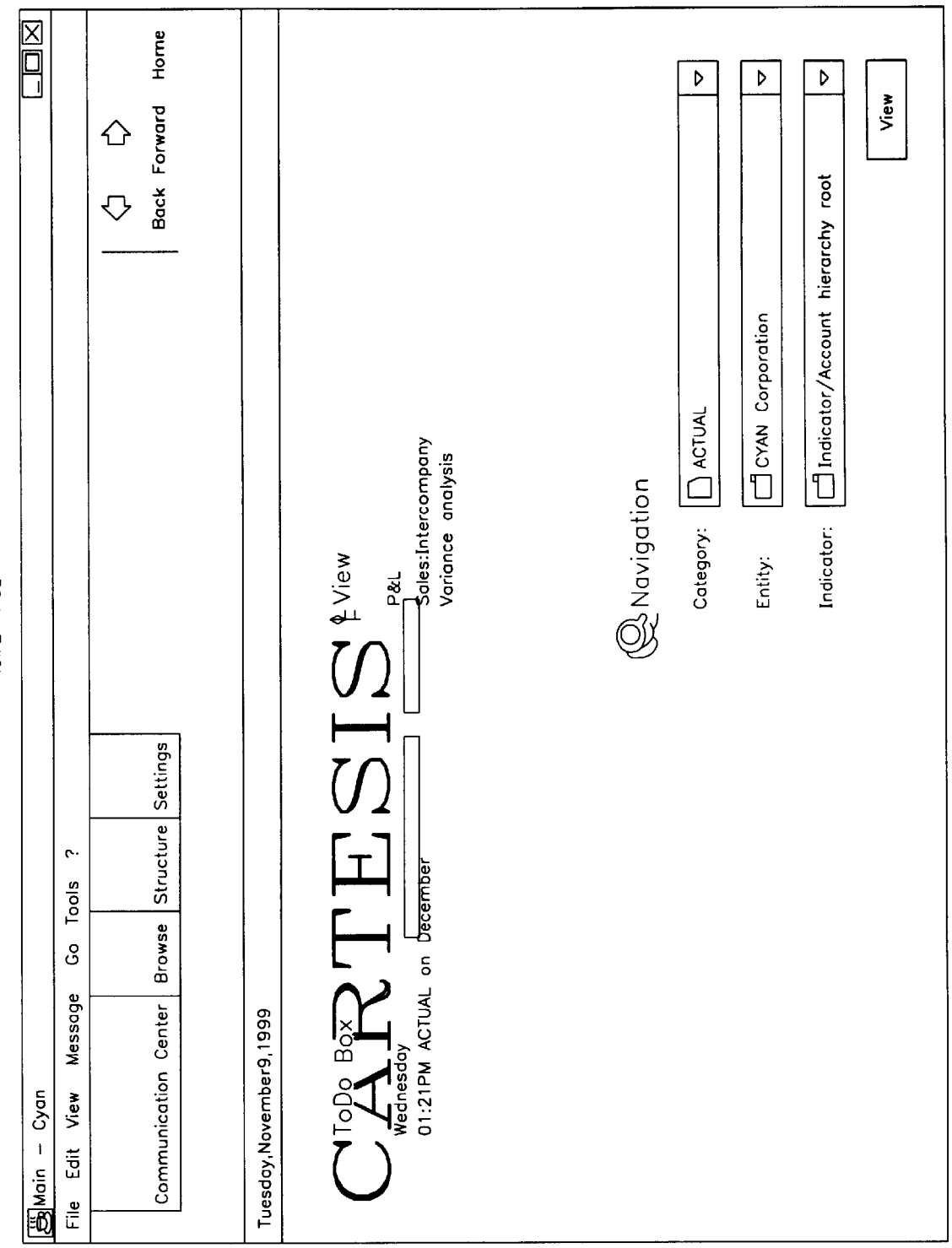

FIGS. 16–25 are screenshots of typical computer display screens that a user sees when he or she operates the method of the present invention using a personal computer. In particular:

FIG. 16 is a screenshot of a typical "home page."

Figure 17:
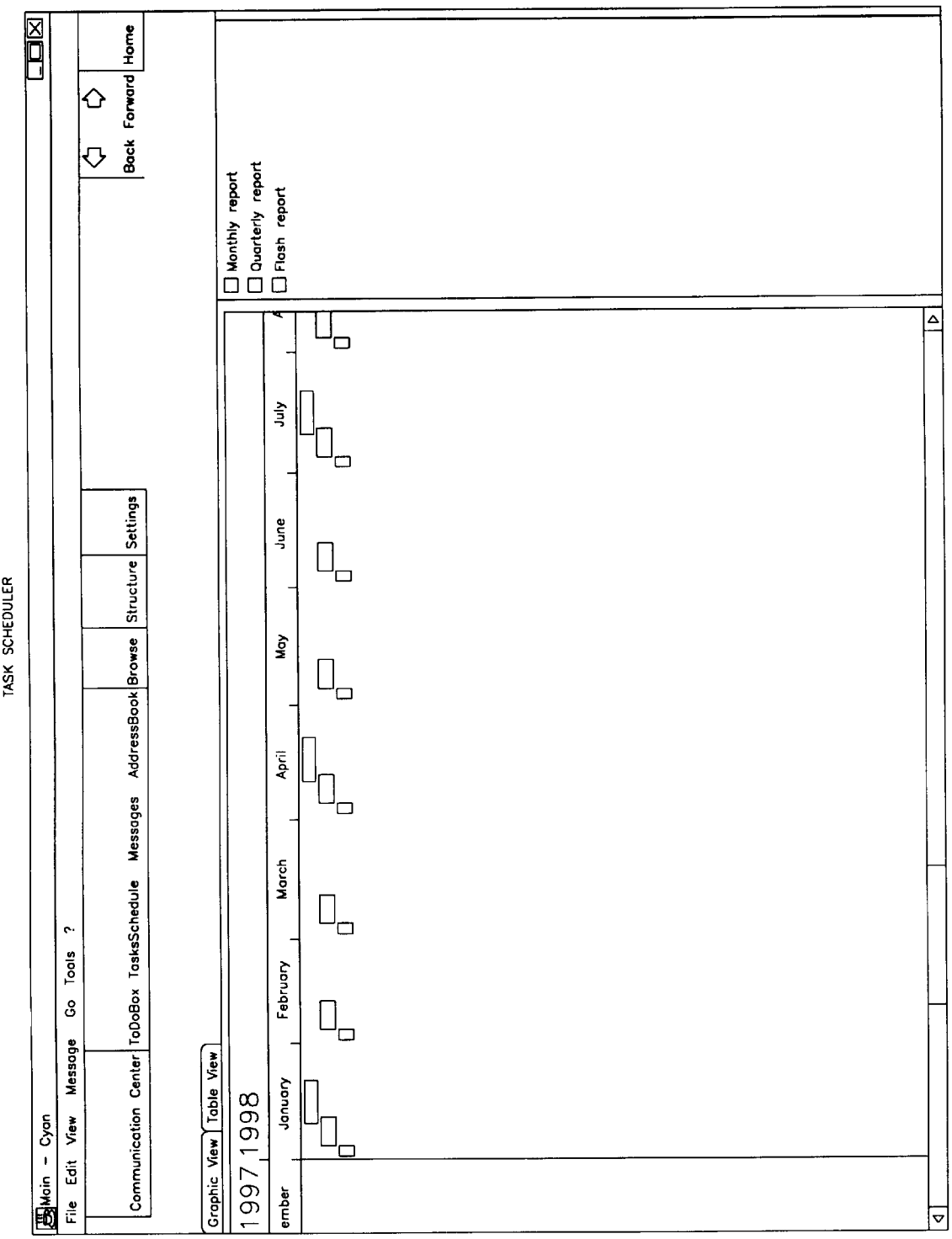

FIG. 17 is a screenshot of the task scheduler feature of the invention.

Figure 18:
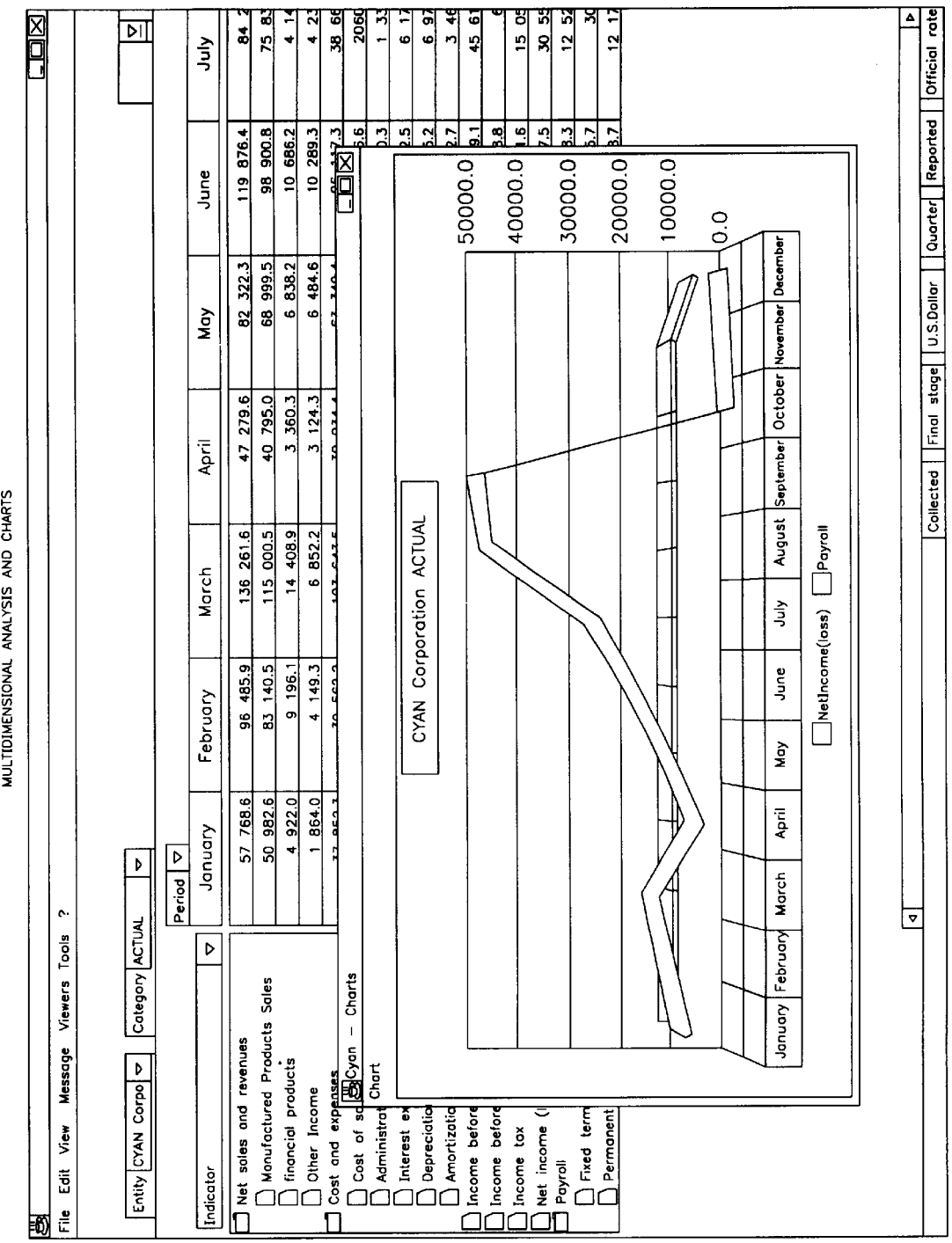

FIG. 18 is a screenshot showing a multidimensional analysis and chart.

Figure 19:
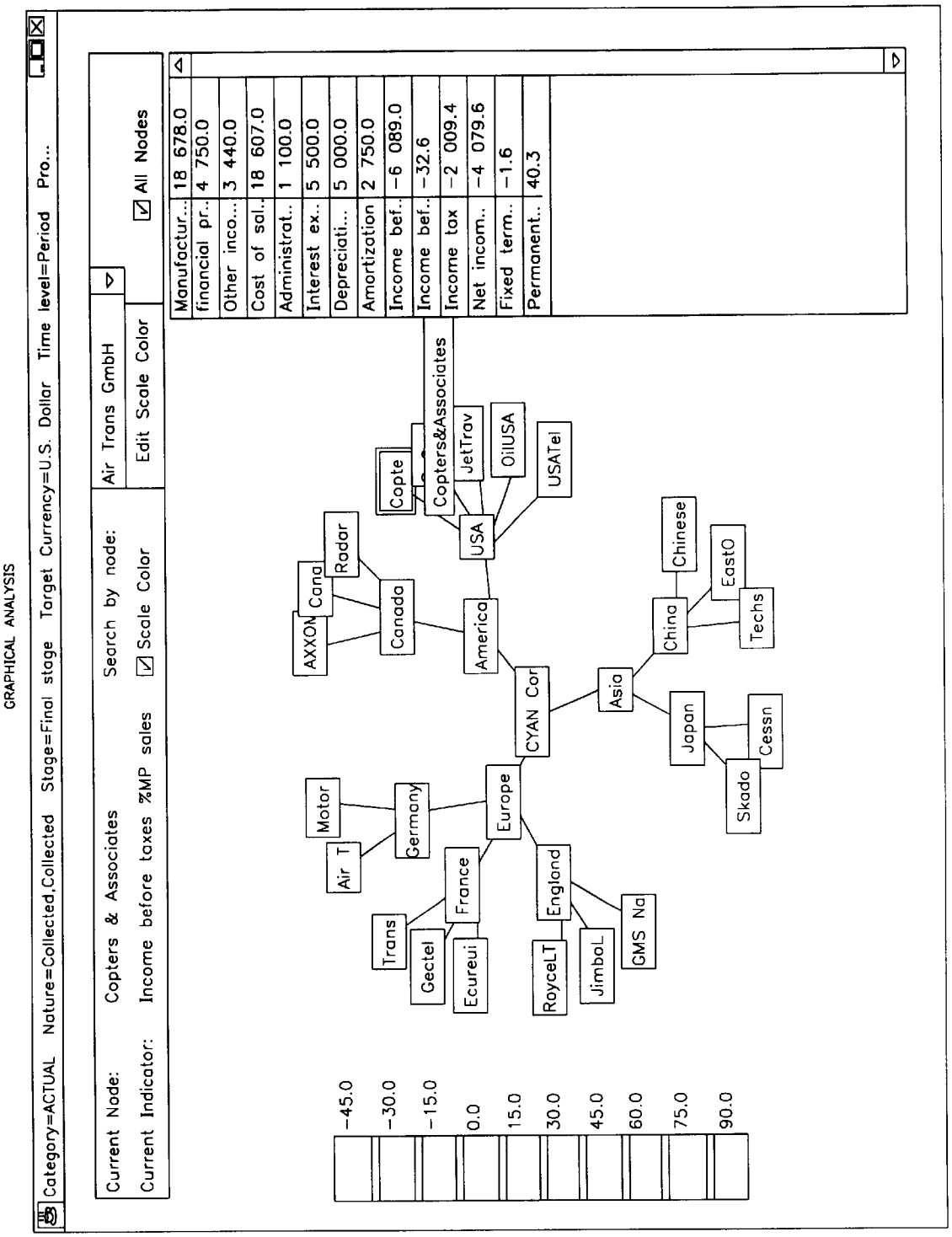

FIG. 19 is a screenshot of a representative graphical analysis.

Figure 20:
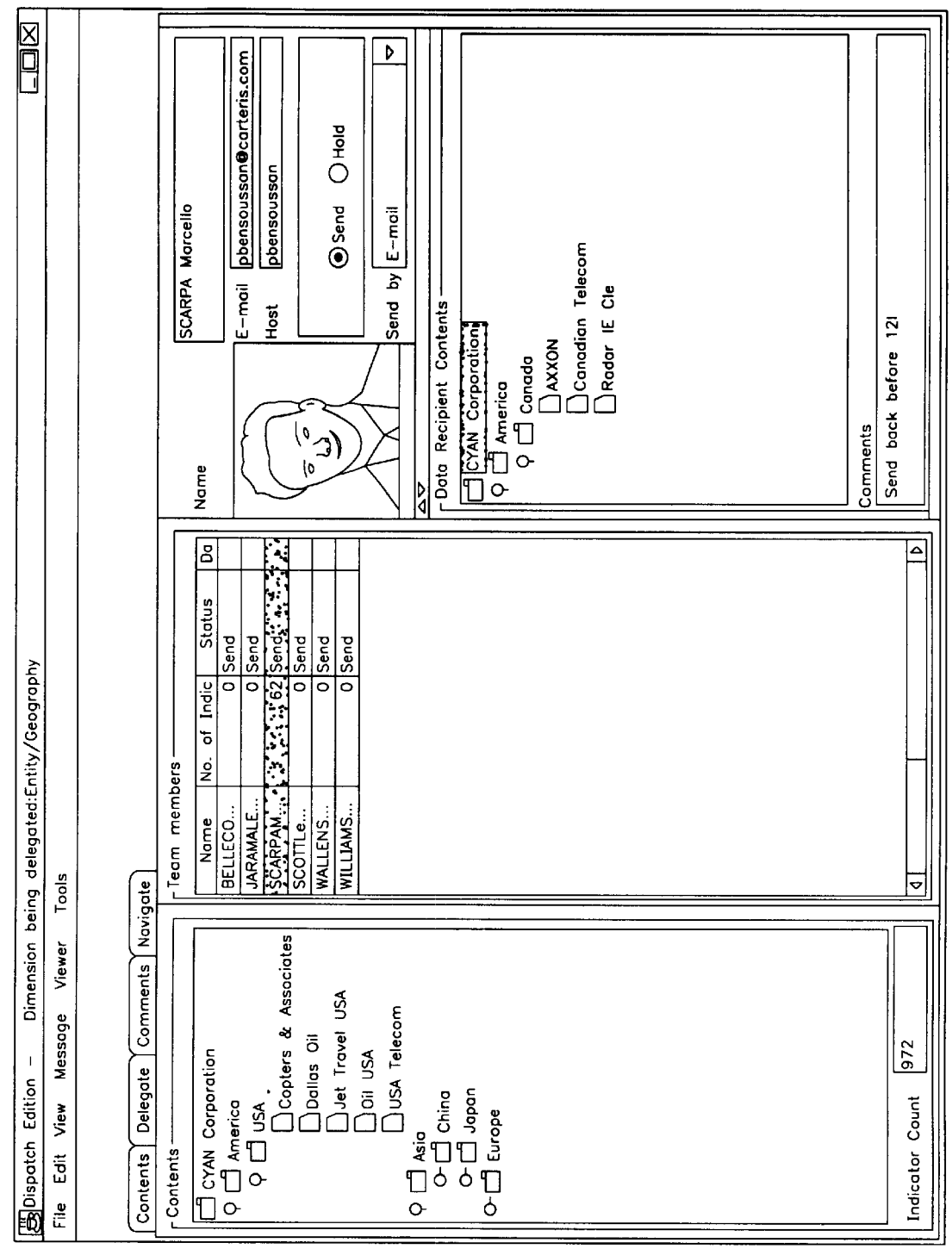

FIG. 20 is a screenshot of a delegation window.

Figure 21:
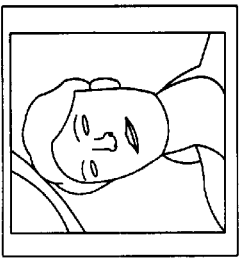

FIG. 21 is a screenshot of a delegate edition window.

FIG. 22 is a screenshot showing the breakdown of a cube and core-cube.

FIG. 23 is a screenshot of an instant consolidation operation, specifically currency conversion.

FIG. 24 is a screenshot of an instant consolidation operation, specifically intercompany elimination.

FIG. 25 is a screenshot of an instant consolidation operation, specifically time aggregation.

One Specific Programming Implementation.

In one specific embodiment of the present invention, Cyan is written in the Java™ computer programming language. It can run on a IBM®-compatible PC (Pentium II or III) with 128-Meg RAM and a 1–20 gigabyte hard drive. It also runs on Unix, for example on the Sun® Microsystems Solaris™ system. Data is stored in standard relational databases, such as Oracle® products or the Microsoft® SQL Server™.

Conclusion

In summary, the present invention discloses a method, system and article of manufacture which enhance the ability to aggregate and report on data stored in a multidimensional database. The database consists of a hierarchy of data items, each item representing an account. Each account may hold either numerical data (figures) or multimedia content. The invention is particularly useful in assisting financial controllers of company or other organization in gathering data and generating reports. Navigation and communication tools are also included. The invention complies with existing on-line analytical processing (OLAP) standards, and improves upon conventional OLAP methods, software and systems.

The foregoing description of the preferred embodiments of invention have been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims attended hereto.

Glossary of OLAP Terms ad hoc analysis

A type of analysis in which you answer questions by manipulating the dimensions, dimension values, and layout of data. You can rotate the data in order to change its dimensional orientation. You can also drill down or up on designated values in order to expand or collapse dimension hierarchies. (See also dimension; dimension value; drill; hierarchy; rotate.)

administrator

See database administrator (DBA).

aggregation

The consolidation of data for several dimension values into a single value, such as the total units sold for all countries, or into a smaller set of values, such as the average units sold for countries in each region. Data is often collected at the lowest level of detail and is aggregated into higher level totals for analysis. (See also dimension value; level.)

ancestor (1) A dimension value at any level above a particular value in a hierarchy. The ancestor value is the aggregated total of the values of its descendants.

(2) In OLAP products, in the inheritance hierarchy, an ancestor is also an object that is two or more levels above a derived object. The level immediately above the derived object is the parent.

(Contrast with descendant. See also aggregation; dimension value; hierarchy; level; object; parent.)

argument

A keyword, constant, or object name that provides input to a command, function, method, or program. An argument can indicate the data values on which the command, function, method, or program operates. It can also specify the way in which the command, function, method, or program operates. Another word for argument is "parameter."

array

A group of data cells that are arranged by the dimensions of the data. For example, a spreadsheet is a two-dimensional array in which the cells are arranged in rows and columns, with one dimension forming the rows and the other dimension forming the columns. A three-dimensional array can be visualized as a cube with each dimension forming one edge of the cube. (See also cell; dimension; variable.)

attribute

A descriptive characteristic that is shared by dimension values. Attributes represent logical groupings that allow users to select data based on like characteristics. For example, in a database representing footwear, you can use a shoe color attribute to select all boots, sneakers, and slippers that share the same color. (See also dimension value.)

axis

A component that serves as the major reference point for plotting data in a graph. Axes are used in graphs such as area, bar, line, bar-line, and scatter. The primary axes in a graph are referred to as the X-axis and the Y-axis. (See also graph.)

cell

A single data value. A cell is identified by one value from each of the dimensions. For example, if you have a variable with the dimensions MONTH and DISTRICT, each combination of a month and a district identifies a separate cell of that variable. (See also dimension; variable.)

child (1) A dimension value at the level immediately below a particular value in a hierarchy. Values of children are included in the calculation that produces the aggregated total for a parent. A dimension value may be a child for more than one parent if the dimension has more than one hierarchy.

(2) In OLAP products, in the inheritance hierarchy, a child is also an object that is derived from another object. The source object is called the parent. (Contrast with parent. See also aggregation; dimension value; hierarchy; level; object.)

command

An instruction in a programming language. Typically, a command consists of the command name followed by one or more arguments. (See also argument)

composite

A list of dimension-value combinations, in which a given combination has one value taken from each of the dimensions on which the composite is based. A given combination is an index into one or more sparse data variables. The purpose for using a composite is to store sparse data in a compact form.

A composite can be named or unnamed. A named composite is a database object that you have explicitly defined. An unnamed composite is automatically created by some languages when you define a variable with some dimensions specified as sparse. In this case, the composite is not a database object.

(Contrast with conjoint dimension. See also dimension; dimension value; sparsity; variable.)

conjoint dimension

A dimension that you build on base dimensions. Each value in a conjoint is a combination of values, one from each of the conjoint's base a dimensions. The purpose for using a conjoint is to achieve fine control over the status of individual combinations of base dimension values. For storing sparse data, you should almost always use a composite instead of a conjoint, because composites are easier to use. The exception to this guideline is the case in which you want to be able to specify every dimension-value combination in status. In this situation, use a conjoint.

For a variable that is not sparse and not dimensioned by a conjoint, you might want to define a separate conjoint to hold a set of dimension-value combinations that meet one or more specific criteria. For example, you might include only dimension-value combinations for which the variable has values higher than a given number.

(Contrast with composite. See also dimension; dimension value; sparsity; variable.)

data cube

An object that defines the contents and structure of the data to be included in a view, for example, when a user displays a graph. A data cube contains edges that represent the cube's rows, columns, and pages. (See also edge;)

database (1) A single file (possibly accompanied by extension files) that contains objects that organize, store, and manipulate data. Examples of such objects are variables, dimensions, formulas, models, and programs.

(2) In some OLAP applications, a collection of OLAP databases that are presented as a single, logical unit. (See also OLAP.)

database administrator (DBA)

The person responsible for creating, installing, configuring, and maintaining the databases in the OLAP and application environments, so that users can access and analyze data effectively. (See also database; OLAP.)

database dictionary
See dictionary.

DBA
See database administrator.

definition
The description of a database object, as stored by OLAP. An object's definition includes characteristics such as the object's name, type (e.g., dimension or variable), data type, dimensions, long description, permission specifications, and properties. (See also dictionary; OLAP<<; object.)

descendant
(1) A dimension value at any level below a particular value in a hierarchy. Values of descendants are included in the calculation that produces the aggregated total for an ancestor.

(2) In OLAP, in the inheritance hierarchy, a descendant is also an object two or more levels below another object.

The level immediately below is the child.

(Contrast with ancestor. See also aggregation; child; dimension value; hierarchy; level; object.)

dictionary
The collection of definitions of the objects in a database. The dictionary is also called the database dictionary.

(See also database; definition; object.)

dimension
A type of database object that is a list of values that provide categories for data. A dimension acts as an index for identifying values of a variable. For example, if you have sales data with a separate sales figure for each month, then the data has a MONTH dimension; that is, the data is organized by month. A dimension is similar to a key in a relational database.

Any item of data within a multidimensional variable can be uniquely and completely selected by specifying one member from each of the variable's dimensions; For example, if a sales variable is dimensioned by MONTH, PRODUCT, and MARKET, specifying "January" for the MONTH dimension, "Stereos" for the PRODUCT dimension, and "Eastern Region" for the MARKET dimension uniquely specifies a single cell in the variable. Thus, dimensions offer a concise and intuitive way of organizing and selecting data for retrieval, updating, and performing calculations.

A dimension can be simple, with values that are single text or integer values, or it can be conjoint, with values that are combinations of values in other dimensions. A composite is not a dimension, but it is a conjoint-like internal object that OLAP treats like a dimension for the purpose of handling sparse data.

(See also composite; conjoint dimension; dimension value; OLAP; multidimensional data; object; sparsity; variable.)

dimension hierarchy
See hierarchy.

dimension label
A text description for a dimension. For example, a dimension that is named GEOGRAPHY might have the label "Geographic Areas." The label, rather than the name, can be displayed in reports, tables, and graphs. (See also dimension.)

dimension value
One element in the list that makes up a dimension. For example, a computer company might have dimension values in the PRODUCT dimension called "LAPTOP" and "DESKTOP." Values in the GEOGRAPHY dimension might include "Paris" and "New York." Values in the TIME dimension might include "MAY1999" and "JAN2000." (See also dimension.)

dimension value label
A text description for a dimension value. For example, in a PRODUCT dimension that has values called "LAPTOP" and "DESKTOP," the "LAPTOP" value might have a label "Laptop Computer."

Dimension value labels might appear as row, column, and page labels in reports or tables and as tick labels in graphs. (See also dimension value.)

document
A vehicle for viewing, analyzing, or entering data that is presented by an application. Reports, graphs, and worksheets are types of documents.

(See also ad hoc analysis, graph; report.)

drill
To navigate up and down through the levels of aggregation in a dimension that has a hierarchy. When selecting dimension values or viewing data, you can expand or collapse a dimension hierarchy by drilling down or up in it. Drilling down expands the view to include child values that are associated with parent values in the dimension hierarchy. Drilling up collapses the list of descendant values associated with a parent value in the dimension hierarchy.

In a typical OLAP application, you can click on an icon to drill down on (expand) the hierarchy or on a different icon to drill up on (collapse) the hierarchy. (See also child; dimension; hierarchy; level; parent.)

edge
A set of one or more dimensions that are displayed together in a data cube or document. The three edges of the data cube are referred to as the row (or down) edge, the column (or across) edge, and the page edge. The following figure shows the row, column, and page edges of a data cube. (See also data cube; document; page.)

embedded total
A predefined level of aggregation built into a dimension for which a hierarchy exists. For example, in a TIME dimension, each quarter represents the total for the months in the quarter.

family
A group of related dimension values that correspond to the levels of the dimension hierarchy. Dimension values within a family can relate to each other as ancestor, parent, child, and descendant. (See also ancestor; child; descendant; dimension value; hierarchy; level; parent.)

formula
A type of database object that represents a stored calculation, or procedure that produces a value. A formula provides a way to define and save complex or frequently used relationships within the data without resaving the data itself. Each time you use a formula, OLAP performs the calculation or procedure that is required to produce the value.

function
  A programming language routine that returns a value.
graph
  (1) A pictorial presentation of multidimensional, numeric data. A graph is an analysis tool that is used to view, manipulate, and print data. Types of graphs include area, bar, line, bar-line, pie, and scatter graphs.
  (2) In OLAP products, a graph is also an object that represents the pictorial presentation of data.
hierarchy
  A means of organizing and structuring data. A hierarchy exists when values within a dimension are arranged in levels, with each level representing the aggregated total of the data from the level below. Some dimensions have multiple hierarchies based on them. For example, a hierarchy based on the GEOGRAPHY dimension, in which dimension values are arranged in five levels, would be structured as follows: Data at the Customers level is aggregated into the Cities level, which, in turn, is aggregated into the Countries/Areas, Continents/Regions, and Global levels. (See also aggregation; ancestor; child; descendant; dimension value; level; parent.)
hypercube
  (See multidimensional data)
level
  A position in a dimension hierarchy. Each level above the base level represents the aggregated total of the data from the level below. For example, the TIME dimension might have ascending levels such as Month, Quarter, and Year. Within a dimension hierarchy, a dimension value at one level has a family relationship with the dimension values at the levels above and below that level. (See also aggregation; dimension value; family; hierarchy.)
measure
  Data that can be examined and analyzed, such as sales or cost data. You can select and display the data in a measure. Measures can be stored as variables or relations, or measures can be calculated by means of formulas. There are both base measures and custom measures. Base measures, such as Volume Sales and Dollar Sales, are always available. Custom measures, such as Volume Share Year Ago, are measures that you can create using base measures. (See also formula; relation; variable.)
metadata
  Data that describes other data. An example of metadata is a variable that lists the names of levels in a hierarchy or that holds the number of decimal places to be used for displaying data. Client applications often use metadata when displaying multidimensional data in graphs, reports, tables, and so on. (See also multidimensional data; object.)
model
  A type of database object that contains a set of interrelated equations that are used to calculate data and assign it to a variable or dimension value. In most cases, models are used when working with financial data. (See also dimension value; object; variable.)
multidimensional data
  Data organized by two or more dimensions. With two dimensions, the data is structured as an array with rows and columns. With three dimensions, it is structured as a cube in which each dimension forms an edge. Structures with more than three dimensions have no physical metaphor, but they can organize data in ways that are useful for analysis. For example, structures with four dimensions are commonly known as "hypercubes." Multidimensional databases are optimized for complex data analysis. For example, a Sales variable might be dimensioned by TIME, PRODUCT, and GEOGRAPHY, so that only a few short steps would be needed to find the 10 cities with the top sales of a certain product over the last 3 months. (See also cell; dimension.)
NA value
  A special data value that indicates that data is "not available" (NA). NA is the value of any cell to which a specific data value has not been assigned or for which data cannot be calculated. (See also cell; sparsity.)
object
  (1) In OLAP, a distinct item in the database, which is defined as an entry in the database dictionary. Objects are the basic pieces of an OLAP database. When you build a database, you must define one or more objects to organize, store, and retrieve the data. OLAP recognizes objects such as dimensions, variables, relations, formulas, and programs.
  (2) In OLAP products, a fundamental building block. An object represents a concept or a model of something from the real world, such as a briefing, a table, or a graph. Objects have well-defined members (or parts) through which they interact with their environment. The members of an object include properties, events, methods, and contents. (See also database; dictionary.)
OLAP
  On-line analytical processing. OLAP is a category of software technology that enables analysts, managers, and executives to gain insight into data by accessing a wide variety of views of information. Such information has been organized to reflect the real dimensionality of the user's enterprise. OLAP functionality is characterized by dynamic, multidimensional analysis of consolidated enterprise data, which supports analytical and navigational activities such as the following:
  Calculating and modeling across dimensions and through hierarchies
  Analyzing trends over sequential time periods
  Creating slices of data for on-screen viewing
  Drilling down to lower levels of consolidation
  Reaching through to underlying detail data
  Rotating to change the dimensional orientation in the viewing area
  OLAP analysis tools run against a multidimensional data engine or interact directly with a relational database management system (RDBMS). (See also dimension; drill; hierarchy; model; multidimensional data; slice.)
page
  (1) A slice of data included in a view (such as a table, report, or graph). Additional pages display additional slices of data. (See also multidimensional data; slice.)
  (2) A page can also refer to a page object, which is a variety of window. It can correspond to a page in a briefing. When you design a briefing or project, page objects serve as the canvas on which you place other objects, such as buttons, tables, and graphs.
  (3) A page can also refer to a unit of storage in an OLAP database.
parent
  (1) A dimension value at the level immediately above a particular value in a hierarchy. The parent value is the aggregated total of the values of its children.

(2) In the inheritance hierarchy, a parent is also an object from which one or more objects have been derived.

Objects derived from the parent are called children.

(Contrast with child. See also aggregation; dimension value; hierarchy; level.)

program

A type of database object that contains a series of OLAP language commands. A program is a stored procedure that executes a set of related commands. Programs can be nested, with one calling another to create a complete application or sophisticated database maintenance tool. A program can return a value; in this case, it is called a user-defined function. (See also command.)

property

A characteristic of an object or component. Properties provide identifiers and descriptions, define object features (such as the number of decimal places or the color), or define object behaviors (such as whether an object is enabled). (See also object.)

relation

A type of database object that establishes a correspondence between the values of a given dimension and the values of that dimension or other dimensions in the database. For example, you might have a relation between cities and sales regions, such that each city belongs to a particular region. A relation is similar to a single-dime nsioned variable. However, it is distinct from most variables, because each cell holds the value of a dimension. For example, in a relation between cities and sales regions, the relation would be dimensioned by CITY. Each cell would hold the corresponding value of the REGION dimension. (See also cell; dimension; dimension value; variable.)

report

A tabular presentation of multidimensional data. A report is an analysis tool that is used to view, manipulate, and print data. (See also table.)

rotate

To change the dimensional orientation of the data that you are viewing. Such changes can include swapping dimensions or moving a dimension so that its values label the rows, columns, or pages. (See also dimension; page.)

saved selection

A set of dimension values that has been saved either as a list of values or as a script. You can save selections that you build, or your database administrator can create saved selections and make them available to you. Saved selections are a time-saving feature: each time that you need to re-use a selection, you can simply retrieve a saved selection without having to recreate it. (See also dimension value; selection.)

selection (1) The set of dimension values currently chosen for a dimension, or the script that contains conditions or criteria to specify those values.

(2) A selection is also an object that specifies both the dimension values and the script. (Contrast with status. See also dimension value; saved selection.)

Selector (1) A set of tools that you use to choose the dimension values to include, for instance, in a report, table, graph, or dimension list box. For example, you can use the Selector to choose the top 10 cities based on Sales or those cities whose Sales exceeded Quota by 15 percent.

The Selector also allows you to sort dimension values and to create and retrieve saved selections.

(2) In OLAP products, a Selector is also an object that presents the tools for choosing dimension values. (See also dimension value; saved selection; selection.)

slice

A subset of multidimensional data. A slice is defined by selecting specific values of the data's dimensions. (See also dimension; measure; multidimensional data.)

sparsity

A concept that refers to multidimensional data in which a relatively high percentage of the combinations of dimension values do not contain actual data. Such "empty," or NA, values take up storage space in the database. To handle sparse data efficiently, you can create a composite. There are two types of sparsity.

(1) Controlled sparsity—Occurs when a range of values of one or more dimensions has no data; for example, a new variable dimensioned by MONTH for which you do not have data for past months. The cell exist because you have past months in the MONTH dimension, but the cells contain NA values.

(2) Random sparsity—Occurs when NA values are scattered throughout the variable, usually because some combinations of dimension values never have any data. For example, a district might only sell certain products and never have data for other products. Other districts might sell some of those projects and others ones, too.

(See also composite; multidimensional data; NA value.)

status

The list of currently accessible values for a given dimension. (Contrast with selection. See also dimension; dimension value.)

table (1) A presentation of multidimensional data in rows, columns, and pages. A table is an analysis tool that is used to view, manipulate, and print data.

(2) In OLAP products, a table is also an object that represents the presentation of data. (See also page; report.)

variable

A type of database object that stores data. The data type of a variable indicates the kind of data that it contains.

If a variable has dimensions, those dimensions organize its data, and there is one cell for each combination of dimension values. A dimensioned variable is an array whose cells are individual data values.

If a variable has nodimensions, it is a single-cell variable, which contains one data value. (see also array; cell; dimension; dimension value; object.)

What is claimed is:

1. A method of executing commands in a computer to perform database operations on a multidimensional database in a memory, the method comprising the steps of:

creating a multidimensional computer database;

structuring data in said database as a series of accounts, each account configured to store either financial data or multimedia data;

arranging said accounts into a hierarchy;

facilitating communications using said database through subscriptions filed in said database by authorized users and through delegation of responsibility through data requests received from said users;

joining dimensions of said database to facilitate navigation through said database; and aggregating data within a hierarchy of accounts to produce a report;

wherein, a value of said data may be instantly retrieved in a real-time operation by a method comprising the steps of:

(a) accepting a request for a value, uniquely identified by a combination of elements of the dimensions defined when creating the multi-dimensional database;

(b) determining if said value is in a cache memory and, if so, jump to step (n), otherwise proceed;

(c) determining if said value must be computed by a formula and, if so, jump to step (g), otherwise proceed;

(d) determining if any of the elements of dimensions identifying said value is an aggregation node in a hierarchy and, if so, jump to step (j), otherwise proceed;

(e) retrieving said value from the database;

(f) jumping to step (m);

(g) retrieving the value of all terms comprising said formula by applying the method currently described to each one;

(h) computing said formula to produce said value;

(i) jumping to step (m);

(j) retrieving all the values associated with the dimension elements that compose said aggregation node (s), by applying the method currently described to each one;

(k) computing an aggregated value;

(l) jumping to step (o);

(m) storing said value in the cache memory, and jumping to step (o);

(n) retrieving said value from the cache memory; and (o) responding to said request for a value with said value.

* * * * *